US012717850B2

(12) United States Patent
Jade et al.

(10) Patent No.: US 12,717,850 B2
(45) Date of Patent: Aug. 25, 2026

(54) SYSTEM AND METHOD FOR COMBINING UNSUPERVISED MACHINE LEARNING AND INFORMATION EXTRACTION MODELS FOR TOPIC MODELING

(71) Applicant: SAS Institute Inc., Cary, NC (US)

(72) Inventors: Teresa S. Jade, Cary, NC (US); Meilan Ji, Beijing (CN); Russell D. Albright, Spring Lake, MI (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/256,474

(22) Filed: Jul. 1, 2025

(65) Prior Publication Data

US 2026/0010722 A1 Jan. 8, 2026

Related U.S. Application Data

(60) Provisional application No. 63/697,677, filed on Sep. 23, 2024, provisional application No. 63/696,449,
(Continued)

(51) Int. Cl.
*G06F 16/93* (2019.01)
*G06F 16/34* (2025.01)
(Continued)

(52) U.S. Cl.
CPC ............ *G06F 16/93* (2019.01); *G06F 16/345* (2019.01); *G06F 16/35* (2019.01); *G06F 40/226* (2020.01);
(Continued)

(58) Field of Classification Search
CPC ............................ G06F 40/284; G06F 40/253
(Continued)

(56) References Cited

U.S. PATENT DOCUMENTS 8,296,309 B2 * 10/2012 Brassil .................. G06F 16/335 707/754
10,467,344 B1 * 11/2019 Jade ...................... G06F 40/205
(Continued)

FOREIGN PATENT DOCUMENTS

WO WO-2023144629 A1 * 8/2023 ........... G06F 16/287

OTHER PUBLICATIONS

"Transition guide-Bulk Data Storage System (BDSS)", Retrieved on Jul. 11, 2025, 1 page.
(Continued)

*Primary Examiner* — Edwin S Leland, III
(74) *Attorney, Agent, or Firm* — Padowithz Alce; Quintin Scheitlin; Alce PLLC

(57) ABSTRACT

A data processing system and method include receiving a set of documents from which to generate at least one topic, creating at least one information extraction model for the set of documents, executing the at least one information extraction model to extract a plurality of text segments from the set of documents by applying one or more rule sets defined for at least one entity, word list, or grammatical pattern and extracting a plurality of text portions from the set of documents based on the one or more rule sets as the plurality of text segments, inputting at least a subset of the plurality of text segments into an unsupervised machine learning model, and executing the unsupervised machine learning model to output the at least one topic for the set of the documents.

30 Claims, 19 Drawing Sheets

Related U.S. Application Data filed on Sep. 19, 2024, provisional application No. 63/678,191, filed on Aug. 1, 2024, provisional application No. 63/673,873, filed on Jul. 22, 2024, provisional application No. 63/669,341, filed on Jul. 10, 2024, provisional application No. 63/667,303, filed on Jul. 3, 2024.

(51) Int. Cl.
*G06F 16/35* (2025.01)
*G06F 40/226* (2020.01)
*G06F 40/247* (2020.01)
*G06F 40/253* (2020.01)
*G06F 40/284* (2020.01)
*G06F 40/289* (2020.01)
*G06F 40/30* (2020.01)
*G06N 20/00* (2019.01)

(52) U.S. Cl.
CPC .......... *G06F 40/247* (2020.01); *G06F 40/253* (2020.01); *G06F 40/284* (2020.01); *G06F 40/289* (2020.01); *G06F 40/30* (2020.01); *G06N 20/00* (2019.01)

(58) Field of Classification Search
USPC .............................................................. 704/9
See application file for complete search history.

(56) References Cited

U.S. PATENT DOCUMENTS 10,699,081 B2* 6/2020 Jade ...................... G06F 40/284
11,049,502 B1* 6/2021 Cheng ..................... G10L 25/30
11,138,979 B1* 10/2021 Cheng ..................... G10L 25/30
11,145,309 B1* 10/2021 Yang ....................... G10L 25/78
11,335,350 B2* 5/2022 Li .......................... G06N 3/044
11,373,655 B2* 6/2022 Li .......................... G10L 25/30
11,404,053 B1* 8/2022 Cheng ................... G06F 40/205
11,423,680 B1* 8/2022 Jade ...................... G06F 16/353
11,497,988 B2* 11/2022 Shukla .................... A63F 13/25
11,501,547 B1* 11/2022 Jade ................. G06V 30/19113
11,538,481 B2* 12/2022 Li .......................... G10L 15/04
11,776,545 B2* 10/2023 Li .......................... G10L 25/30
704/200
11,797,610 B1 10/2023 Ferrucci et al.
11,797,781 B2* 10/2023 Wang ...................... G06F 40/55
11,810,572 B2* 11/2023 Cheng ................... G06N 3/045
11,816,428 B2* 11/2023 Begun ................... G06F 40/186
11,907,678 B2* 2/2024 Wang .................... G06F 40/211
11,947,916 B1* 4/2024 Agarwal ............... G06F 16/335
12,254,015 B1* 3/2025 Kumar ................. G06F 16/243
12,412,000 B2* 9/2025 Sinha .................. G05B 23/027
12,417,352 B1 9/2025 Murthy et al.
2004/0098385 A1* 5/2004 Mayfield ............... G06F 16/313
707/E17.084
2009/0306962 A1 12/2009 Harlow et al.
2010/0114561 A1* 5/2010 Yasin .................... G06F 16/355
704/9
2016/0247068 A1* 8/2016 Lin ......................... G06F 40/40
2020/0111023 A1* 4/2020 Pondicherry Murugappan ...........
G06N 5/02
2021/0042767 A1* 2/2021 Guan ................. G06Q 30/0201
2021/0056170 A1 2/2021 Bohannon et al.
2022/0092265 A1* 3/2022 Bhattacharya ........ G06F 40/117
2022/0180865 A1* 6/2022 Kwatra ................... G10L 15/20
2022/0198136 A1 6/2022 Peleg et al.
2023/0043457 A1* 2/2023 Khan ...................... G06F 40/40
2023/0237277 A1* 7/2023 Reza ..................... G06F 40/186
704/9
2023/0259711 A1* 8/2023 Goto ..................... G06F 40/289
704/9
2023/0325601 A1* 10/2023 Sabharwal ............... G06N 3/09
704/9
2024/0104055 A1* 3/2024 McAnallen ........... G06F 16/164
2024/0160651 A1* 5/2024 Bhattacharjee ....... G06F 16/345
2024/0160653 A1* 5/2024 Chowdhury .......... G06F 16/313
2024/0281487 A1* 8/2024 Bathwal ............ G06F 16/24575
2024/0282298 A1 8/2024 Koneru et al.
2024/0289560 A1 8/2024 Kelly
2024/0362197 A1* 10/2024 Thompson ........... G06V 30/413
2024/0394479 A1* 11/2024 Pathak .................. G06F 40/295
2025/0023779 A1 1/2025 Sumedrea et al.
2025/0053748 A1* 2/2025 Fayyaz ................... G06F 40/35
2025/0068667 A1* 2/2025 Blum .................. G06F 16/3329
2025/0094538 A1* 3/2025 Wan ................. G06F 16/24578
2025/0094711 A1* 3/2025 Mishra .................... G06F 40/30
2025/0112878 A1 4/2025 Bayless
2025/0119625 A1* 4/2025 Bhattacharyya ........ G06F 40/30
2025/0148276 A1* 5/2025 Csaki ....................... G06N 3/08
2025/0156465 A1* 5/2025 Nair ...................... G06F 16/345
2025/0200100 A1* 6/2025 Hintz .................... G06F 16/383
2025/0200299 A1* 6/2025 Yuan ....................... G06F 40/40
2025/0200301 A1* 6/2025 Chuang .................. G06N 3/043
2025/0259009 A1 8/2025 Mukherjee
2025/0278607 A1* 9/2025 Doshi .................... G06N 3/045
2025/0342182 A1* 11/2025 Nabel ................. G06F 16/3329
2026/0004135 A1 1/2026 Ailem
2026/0010722 A1* 1/2026 Jade ........................ G06F 16/93

OTHER PUBLICATIONS

"Extracting Information by Machine Learning", Geeksforgeeks, Aug. 2, 2024, Retrieved from Internet URL: https://www.geeksforgeeks.org/machine-learning/extracting-information-by-machine-learning/, Retrieved on Jul. 9, 2025, 7 pages.

Bird et al., "'Little words'—not really: function and content words in normal and aphasic speech", Journal of Neurolinguistics, vol. 15, Issues 3-5, May-Sep. 2002, pp. 209-237.

Mooney et al., "Mining Knowledge from Text Using Information Extraction", ACM SIGKDD Explorations Newsletter, vol. 7, Issue 1, Jun. 1, 2005, 8 pages.

Blei et al., "Latent Dirichlet Allocation", Journal of Machine Learning Research 3, 2003, pp. 993-1022.

Deerwester et al., "Indexing by Latent Semantic Analysis", Journal of the American Society for Information Science, vol. 41, Issue 6, Sep. 1990, pp. 391-407.

"6B. LLM & Generative AI", Retrieved from the Internet URL https://maartengr.github.io/BERTopic/getting_started/representation/llm.html, Retrieved on Mar. 18, 2025, 14 pages.

"TextRank and LexRank", Retrieved from the Internet URL <https://en.wikipedia.org/wiki/Automatic_summarization#TextRank_and_LexRank>, Retrieved date Mar. 21, 2025, 9 pages.

Carlson et al., "Coupled semi-supervised learning for information extraction", WSDM '10: Proceedings of the third ACM international conference on Web search and data mining, Feb. 4, 2010, 10 pages.

Mirza et al., "CATENA: CAusal and TEmporal relation extraction from Natural language texts", Proceedings of Coling 2016, the 26th International Conference on Computational Linguistics: Technical Papers, Dec. 11-17, 2016, pp. 64-75.

Wan et al., "Automatic Labeling of Topic Models Using Text Summaries", Proceedings of the 54th Annual Meeting of the Association for Computational Linguistics, Aug. 7-12, 2016, pp. 2297-2305.

Mei et al., "Automatic labeling of Multinomial Topic Models", Proceedings of the 13th ACM SIGKDD international conference on Knowledge discovery and data mining. ACM, Aug. 12-15, 2007, 10 pages.

Lau et al., "Automatic Labelling of Topic Models", Proceedings of the 49th Annual Meeting of the Association for Computational Linguistics, Jun. 19-24, 2011, pp. 1536-1545.

Mao et al., "Automatic Labeling Hierarchical Topics", In Proceedings of the 21st ACM international conference on Information and knowledge management, Oct. 29-Nov. 2, 2012, pp. 2383-2386.

Kou et al.,"Automatic Labelling of Topic Models Using Word Vectors and Letter Trigram Vectors", Information Retrieval Technology. Springer International Publishing, Dec. 2, 2015, 12 pages.

(56) References Cited

OTHER PUBLICATIONS

Hulpus et al. "Unsupervised Graph-Based Topic Labelling Using DBpedia", Proceedings of the sixth ACM international conference on Web search and data mining, Feb. 4, 2013, 10 pages.
Aletras et al., "Representing Topics Using Images", Proceedings of NAACL-HLT, Jun. 9-14, 2013, pp. 158-167.
Aletras et al., "Evaluating Topic Representations for Exploring Document Collections", Journal of the Association for Information Science and Technology, vol. 68, Issue No. 1, Jul. 28, 2015, pp. 154-167.
Griffiths et al., "Finding Scientific Topics", Proceedings of the National Academy of Sciences, vol. 101, Suppl 1, Apr. 6, 2004, pp. 5228-5235.
"Information Extraction in NLP", Geeksforgeeks, Jun. 18, 2024, Retrieved from internet URL: https://www.geeksforgeeks.org/nlp/information-extraction-in-nlp/, Retrieved on Jul. 9, 2025, pp. 1-12.
"Bulk Data Storage System (BDSS)", Patent Application Full Text Data/XML Version 4.6 Ice (Jan. 2023-Dec. 2023), Retrieved on Mar. 18, 2025, 3 pages.
"Ucirvine/reuters21578", Datasets at Hugging Face, Retrieved from the Internet URL <https://huggingface.co/datasets/ucirvine/reuters21578>, Retrieved on Mar. 18, 2025, 13 pages.
"Domain Knowledge in Machine Learning", Geeks for geeks, Apr. 5, 2024, Retrieved from internet URL: https://www.geeksforgeeks.org/machine-learning/domain-knowledge-in-machine-learning/, Retrieved on Jul. 9, 2025, 8 pages.
Shi et al., "Detecting Pretraining Data from Large Language Models", Published as a conference paper at ICLR, Mar. 9, 2024, 23 pages.
Liu et al., "Lost in the Middle: How Language Models Use Long Contexts", Retrieved from the Internet URL <https://export.arxiv.org/pdf/2307.03172>, Nov. 20, 2023, 17 pages.
Greg Kamradt, "LLMTest_NeedleInAHaystack", Retrieved from the Internet URL <https://github.com/gkamradt/LLMTest_NeedleInAHaystack>, Retrieved on Mar. 19, 2025, 6 pages.
Fu et al., "LazyLLM: Dynamic Token Pruning for Efficient Long Context LLM Inference", Retrieved from the Internet URL <https://arxiv.org/abs/2407.14057>, Jul. 19, 2024, 12 pages.
Gim et al., "Prompt Cache: Modular Attention Reuse for Low-Latency Inference", Proceedings of the 5th MLSys Conference, Apr. 25, 2024, 14 pages.
Douglas E. Appelt et al., "Introduction to information extraction", AI Communications, vol. 12, Issue 3, Aug. 1, 1999, 41 pages.
Li et al., "LongICLBench: Long-context LLMs Struggle with Long In-context Learning", Retrieved from the Internet URL <https://arxiv.org/abs/2404.02060>, Jun. 12, 2024, 19 pages.
Bijit Ghosh, "Prompt Optimization, Reduce LLM Costs and Latency", Retrieved from the Internet URL <https://medium.com/@bijit211987/prompt-optimization-reduce-llm-costs-and-latency-a4c4ad52fb59>, Jun. 3, 2024, 14 pages.
"LLM has a performance problem inherent to its architecture: Latency", Retrieved from the Internet URL <https://www.proxet.com/blog/llm-has-a-performance-problem-inherent-to-its-architecture-latency>, Aug. 1, 2023, 9 pages.
Veraj Paruthi, "How input token count impacts the latency of AI chat tools", Retrieved from the Internet URL <https://glean.com/blog/glean-input-token-llm-latency>, Dec. 3, 2024, 5 pages.
Cheng et al., "Interpretable Text Classification Using CNN and Max-pooling", Oct. 14, 2019, 8 pages.
Sonit Singh, "Natural Language Processing for Information Extraction", Computation and Language, Jul. 6, 2018, 24 pages.
Amir Pouran Ben Veyseh, "Utilizing Text Structure for Information Extraction", Department of Computer and Information Science, University of Oregon, 38 pages.
Yang et al., "A Survey of Information Extraction Based on Deep Learning", Applied Sciences, vol. 12, Issue 19, Sep. 27, 2022, 35 pages.
Tom Sabo, "Streamlining government regulatory responses with natural language processing, GenAI and text analytics" SAS , Apr. 4, 2024, 5 pages.
Pan et al., "LLMLingua-2: Data Distillation for Efficient and Faithful Task-Agnostic Prompt Compression" Retrieved from the Internet URL < https://arxiv.org/pdf/2403.12968>, Aug. 12, 2024, 19 pages.
Joshua Schrier, "Three LLM Summarization Strategies", Retrieved from the Internet URL < https://community.wolfram.com/groups/-/m/t/3027301, Retrieve from internet on Mar. 19, 2025, 8 pages.
Isaac Tham, "Summarize Podcast Transcripts and Long Texts Better with NLP and AI",Retrieved from the Internet URL <https://towardsdatascience.com/summarize-podcast-transcripts-and-long-texts-better-with-nlp-and-ai-e04c89d3b2cb, May 3, 2023, 18 pages.
Gheorghe et al., "vlad-ds/gptrim" Retrieved from the Internet URL <https://github.com/vlad-ds/gptrim>, Retrieved date Jul. 10, 2025, 2 pages.
"LLMLingua: Compressing prompts for Accelerated Inference of Large Language Models", Retrieved from the Internet URL <https://www.microsoft.com/en-us/research/project/llmlingua/llmlingua/>, Retrieved on Jul. 10, 2025, 2 pages.
"LLMLingua-2: Data Distillation for Efficient and Faithful Task Agnostic prompt Compression", Retrieved from the Internet URL < https://www.microsoft.com/en-us/research/project/llmlingua/llmlingua-2/>, Retrieved on Jul. 10, 2025, 2 pages.
"Keyword extraction", WikipediaThe Free Encyclopedia, Retrieved from the Internet URL < https://en.wikipedia.org/wiki/Keyword_extraction>, Retrieved on Mar. 19, 2025, 2 pages.
"Automatic summarization—Keyphrase Extraction", WikipediaThe Free Encyclopedia, Retrieved from the Internet URL < https://en.wikipedia.org/wiki/Automatic_summarization#Keyphrase_extraction>, Retrieved on Mar. 19, 2025, 16 pages.
"Automatic summarization", WikipediaThe Free Encyclopedia, Retrieved from the Internet URL < https://en.wikipedia.org/wiki/Automatic_summarization#TextRank>, Retrieved on Mar. 19, 2025, 16 pages.
"Bert-score 0.3.1", Retrieved from the Internet URL < https://pypi.org/project/bert-score/0.3.1/>, Mar. 6, 2020, 10 pages.
"Azure OpenAI Service pricing", Retrieved from the Internet URL < https://azure.microsoft.com/en-us/pricing/details/cognitive-services/openai-service/>, Retrieved on Mar. 19, 2025, 23 pages.
Shaun D'Souza, "Parser Extraction of Triples in Unstructured Text", Computation and Language, Nov. 6, 2018, 7 pages.
Kurisinkel et al., "LLM Based Multi-Document Summarization Exploiting Main-Event Biased Monotone Submodular Content Extraction", Association for the Advancement of Artificial Intelligence, Oct. 5, 2023, 7 pages.
Shekhar et al., "Towards optimizing the costs of LLM usage", Retrieved from the Internet URL <https://arxiv.org/html/2402.01742v1>, Jan. 29, 2024, 12 pages.
Ryu et al., "Key-Element-Informed sLLM Tuning for Document Summarization", Retrieved from the Internet URL <https://arxiv.org/pdf/2406.04625>, Nov. 19, 2024, 5 pages.
Jiang et al., "TriSum: Learning Summarization Ability from Large Language Models with Structured Rationale", Retrieved from the Internet URL < https://arxiv.org/pdf/2403.10351>, Mar. 15, 2024, 17 pages.
"Historical Timeline of Vaping & Electronic Cigarettes", CASAA Harm Reduction Saves Lives, Retrieved from internet https://casaa.org/education/vaping/historical-timeline-of-electronic-cigarettes/, Retrieved on Mar. 21, 2025, 81 pages.
Ali et al., "E-cigarette Unit Sales, by Product and Flavor Type—United States 2014-2020", Morbidity and Mortality Weekly Report (MMWR), Volumne 69, Issue 37, Sep. 18, 2020, pp. 1313-1318.
Liu et al., "Abstractive Summarization of Large Document Collections Using GPT", Retrieved from the Internet URL < https://arxiv.org/pdf/2310.05690>, Oct. 9, 2023, 18 pages.
Lu et al., "Hybrid Long Document Summarization Using C2F-FAR and ChatGPT: A Practical Study", Retrieved from the Internet URL < https://arxiv.org/pdf/2306.01169>, Jun. 5, 2023, 14 pages.
Liang et al., "An Efficient Coarse-to-Fine Facet-Aware Unsupervised Summarization Framework based on Semantic Blocks", Proceedings of the 29th International Conference on Computational Linguistics, Oct. 12-17, 2022, pp. 6415-6425.

(56) References Cited

OTHER PUBLICATIONS

Yuan et al., “Preserve Context Information for Extract-Generate Long-Input Summarization Framework”, The Thirty-Seventh AAAI Conference on Artificial Intelligence (AAAI-23), vol. 37, No. 11, Jun. 26, 2023, pp. 13932-13939.
“Welcome to PyMuPDF”, Retrieved from the Internet URL < https://pymupdf.readthedocs.io/en/latest/index.html>, Retrieved on Jul. 10, 2025, 8 pages.
“Xml.etree.ElementTree—The ElementTree XML API”, Retrieved from the Internet URL <https://docs.python.org/3/library/xml.etree.elementtree.html>, Retrieved on Jul. 10, 2025, 18 pages.
Jiang et al., “LongLLMLingua: Accelerating and Enhancing LLMs in Long Context Scenarios via Prompt Compression”, Proceedings of the 62nd Annual Meeting of the Association for Computational Linguistics (vol. 1: Long Papers), Aug. 11-16, 2024, pp. 1658-1677.
Federica Citterio, “5 Steps to improve information Extraction using Trustworthy Generative AI”, The SAS Data Science Blog, May 1, 2024, 6 pages.
Li et al., “Reuters Dataset”, Dataset—LDM, Available at https://doi.org/10.57702/y8x8zr20, Dec. 16, 2024, 3 pages.
Maarten Grootendorst, “BERTopic: Neural topic modeling with a class-based TF-IDF procedure”, Available online at https://arxiv.org/pdf/2203.05794, Mar. 11, 2022, 10 pages.
Azher, et al., “LimTopic: LLM-based Topic Modeling and Text Summarization for Analyzing Scientific Articles limitations,” Proceedings of the 24th ACM/IEEE Joint Conference on Digital Libraries, Mar. 13, 2025, 12 pages.
Koloski, et al., “AHAM: Adapt, Help, Ask, Model Harvesting LLMs for Literature Mining”, Available online at https://arxiv.org/pdf/2312.15784, Apr. 16, 2024, pp. 1-13.
Sia, et al., “Tired of Topic Models? Clusters of Pretrained Word Embeddings Make for Fast and Good Topics too!” Proceedings of the 2020 Conference on Empirical Methods in Natural Language Processing (EMNLP), Oct. 6, 2020, 9 pages.
Wang, Han, et al. “Prompting large language models for topic modeling”, 2023 IEEE International Conference on Big Data (BigData). IEEE, Dec. 15, 2023, 6 pages.
Rijcken, et al., “Towards Interpreting Topic Models with ChatGPT”, Paper presented at the 20th World Congress of the International Fuzzy Systems Association, Daegu, Korea, Republic of, Jan. 1, 2023, 8 pages.
Fang et al., “Using Word Embedding to Evaluate the Coherence of Topics from Twitter Data”, SIGIR ’16: Proceedings of the 39th International ACM SIGIR conference on Research and Development in Information Retrieval, Jul. 17-21, 2016, 4 pages.
“Calculating Gini coefficient in Python/numpy”, Stack Overflow, Retrieved from internet URL: https://stackoverflow.com/questions/39512260/calculating-gini-coefficient-in-python-numpy, Retrieved on Jul. 10, 2025, pp. 1-6.
Pandey et al., “Evaluation of crime topic models: topic coherence vs spatial crime concentration”, 2018 IEEE International Conference on Intelligence and Security Informatics (ISI), Nov. 1, 2018, pp. 76-78.
Rudiger, et al., “Topic modeling revisited: New evidence on algorithm performance and quality metrics”, PLOS One, Available online at https://doi.org/10.1371/journal.pone.0266325, Apr. 28, 2022, 25 pages.
Sonkusale et al., “Evaluating Text Preprocessing Methods for Discovering Quality Topics to Improve the Information Retrieval Mechanism”, Acta Scientific Computer Sciences, vol. 5, Issue 9, Aug. 14, 2023, pp. 01-06.
Hussain et al., “Effect of Preprocessing and No of Topics on Automated Topic Classification Performance”, Foundation University Journal of Engineering and Applied Sciences, vol. 3, Issue 1, Jun. 2022, pp. 13-20.
Eler et al., “Analysis of Document Pre-Processing Effects in Text and Opinion Mining”, Information 2018, vol. 9, Issue 4, Apr. 20, 2018, 13 pages.
Sergienko et al., “A Comparative Study of Text Preprocessing Approaches for Topic Detection of User Utterances”, Proceedings of the Tenth International Conference on Language Resources and Evaluation (LREC’16), May 1, 2016, pp. 1826-1831.
Schofield et al., “Understanding Text Pre-Processing for Latent Dirichlet Allocation”, Proceedings of the 15th conference of the European chapter of the association for computational linguistics (EACL), vol. 2, 2017, 4 pages.
Yan et al., “A biterm topic model for short texts”, Proceedings of the 22nd international conference on World Wide Web, May 13, 2013, 11 pages.
Nesca et al., “A scoping review of preprocessing methods for unstructured text data to assess data quality”, International Journal of Population Data Science, vol. 7, Issue 1, Oct. 5, 2022, pp. 1-15.
Churchill, et al., “textPrep: A Text Preprocessing Toolkit for Topic Modeling on Social Media Data”, Proceedings of the 10th International Conference on Data Science, Technology and Applications (DATA 2021), Jan. 1, 2021, pp. 60-70.
Kurtis Pykes, “What is Topic Modeling? An Introduction With Examples”, Datacamp, Oct. 19, 2023, Retrieved from internet URL: https://www.datacamp.com/tutorial/what-is-topic-modeling, 11 pages.
Abdelrazek et al., “Topic modeling algorithms and applications: A survey”, Information Systems, vol. 112, Dec. 7, 2022, pp. 1-33.
Greg Kamradt, “Needle in a Haystack (GPT-4 128K)”, Available online at you tube at https://www.youtube.com/watch?v=KwRRuiCCdmc, Retrieved from internet on Apr. 1, 2025, 18 pages.
Greg Kamradt, “Pressure Testing GPT-4-128K With Long Context Recall”, X Post, Nov. 9, 2023, 2 pages.
Chiche et al., “Part of speech tagging: a systematic review of deep learning and machine learning approaches”, Journal of Big data, vol. 9, No. 1, Jan. 24, 2022, pp. 1-25.
“NLTK Tokenizer”, Dataloop, Retrieved from internet URL: https://dataloop.ai/library/model/shirinyamani_nltk-tokenizer/, Retrieved on Jul. 9, 2025, 12 pages.
“Tokenization”, Linguistic Features—spaCy Usage Documentation, Retrieved from internet URL: https://spacy.io/usage/linguistic-features#tokenization, Retrieved on Jul. 9, 2025, pp. 20-46.
“NLTK: nltk.tokenize package”, Retrieved from internet URL: https://www.nltk.org/api/nltk.tokenize.html, Retrieved on Jul. 9, 2025, pp. 1-15.
“Tagger”, spaCy, Retrieved from internet URL: https://spacy.io/api/tagger, Retrieved on Jul. 9, 2025, pp. 1-20.
“Part of Speech Tagging with Stop words using NLTK in python”, Geeksforgeeks, Apr. 11, 2022, Retrieved from internet URL: https://www.geeksforgeeks.org/python/part-speech-tagging-stop-words-using-nltk-python/, 7 pages.
Richard Nordquist, “Definition and Examples of Function Words in English”, Retrieved from internet URL: https://www.thoughtco.com/function-word-grammar-1690876, Jul. 20, 2024, pp. 1-11.
“Content vs Function Words”, the sound of english, Retrieved from internet URL: https://thesoundofenglish.org/content-function-words/, Retrieved on Jul. 10, 2025, 4 pages.
Brown et al., “Language Models are Few-Shot Learners”, Computation and Language, Jul. 22, 2020, 75 pages.
Tang et al., “Information Extraction: Methodologies and Applications”, Emerging Technologies of Text Mining: Techniques and Applications, Retrieved from Internet URL: https://www.igi-global.com/gateway/chapter/10174#pnlRecommendationForm, 2008, 38 pages.
Small et al.,“Review of information extraction technologies and applications”, Neural Computing and Applications, vol. 25, Dec. 1, 2013, 28 pages.
Teresa Jade, “Concept Rules for Information Extraction Models”, SAS Text Analytics for Business Applications, Mar. 2019, 31 pages.
Mielke et al., “Between words and characters: A Brief History of Open-Vocabulary Modeling and Tokenization in NLP”, Computation and Language, Dec. 20, 2021, 27 pages.
Khyani et al., “An Interpretation of Lemmatization and Stemming in Natural Language Processing”, Journal of University of Shanghai for Science and Technology, vol. 22, Issue 10, Oct. 2020, pp. 350-357.
Chuang et al., “Learning to Compress Prompt in Natural Language Formats,” arXivpreprint.arXiv:2402.18700, 2024.
Jung et al., “Discrete Prompt Compression with Reinforcement Learning,” IEEE Access 12. 2024, pp. 72578-72587.

(56) References Cited

OTHER PUBLICATIONS

"Near Duplicate Detection", Axcelerate 5.13 Administrator Help, Axcelerate 5 Features and Configuration, Associated Documents, 2 pages.
"Make Informed Decisions Faster", BrainSpace, 5 pages.
"Microsoft purview compliance documentation", Protect sensitive data across clouds, apps, and devices, 2 pages.
"Relativity Analytics Textual Near Duplicates", Cyfor eDiscovery Blog Part three, 7 pages.
Mimno, et al., "Optimizing Semantic Coherence in Topic Models," Proceedings of the 2011 Conference on Empirical Methods in Natural Language Processing, Edinburgh, Scotland, UK, Jul. 27-31, 2011, pp. 262-272.
Semantic Roles in NLP, GeeksforGeeks, Retrieved from internet URL: https://www.geeksforgeeks.org/nlp/semantic-roles-in-nlp/, Retrieved on Jul. 9, 2025, 9 pages.
"Tokenization in NLP", Geeksforgeeks, Jun. 4, 2025, Retrieved from internet URL:Tokenization in NLP—GeeksforGeeks, Retrieved on Jul. 9, 2025, 13 pages.
Zhi-Hua Zhou, "A brief introduction to weakly supervised learning", National Science Review, vol. 5, Issue 1, Aug. 25, 2017, pp. 44-53.
Kiss et al., "Unsupervised Multilingual Sentence Boundary Detection", Computational Linguistics, vol. 32, Issue 4, Dec. 1, 2006, pp. 485-525.
Banko et al., "Open Information Extraction from the Web", IJCAI'07: Proceedings of the 20th international joint conference on Artifical intelligence, Jan. 6, 2007, pp. 2670-2676.
Jurafsky et al., "Speech and Language Processing", An Introduction to Natural Language Processing, Computational Linguistics, and Speech Recognition with Language Models, Jan. 12, 2025, 599 pages.
Tf-Idf, Retrieved from internet URL: https://en.wikipedia.org/wiki/Tf%E2%80%93idf, Retrieved on Jul. 9, 2025, 6 pages.
Stephanie Buongiorno, "Grammatical Triples Extraction for the Distant Reading of Textual Corpora", Multidisciplinary Studies Theses and Dissertations, May 13, 2023, 254 pages.
Atapattu et al., "Acquisition of Triples of Knowledge from Lecture Notes: A Natural Language Processing Approach", Proceedings of the 7th International Conference on Educational Data Mining, Jul. 2014, pp. 193-196.
Frohmann et al., "Segment Any Text: A Universal Approach for Robust, Efficient and Adaptable Sentence Segmentation", Jun. 24, 2024, 33 pages.
Mohamed Bakrey Mahmoud, "A simple explanation for Sentence Segmentation and implementation", Medium, Feb. 21, 2023, Retrieved from internet URL:https://mohamedbakrey094.medium.com/a-simple-explanation-for-sentence-segmentation-and-implementation-72c66476e72f, Retrieved on Jul. 9, 2025, 12 pages.
"Tokenization in Natural Language Processing: Methods, Types, and Challenges", Solulab, Retrieved from internet URL:https://www.solulab.com/tokenization-nlp/#elementor-toc_heading-anchor-4, Retrived on Jul. 9, 2025, 25 pages.
"Understanding Tokenization in Nlp: A Beginner's Guide to Text Processing", Grammarly, Dec. 2, 2024, Retrieved from internet URL: https://www.grammarly.com/blog/ai/what-is-tokenization/, Retrived on Jul. 9, 2025, 19 pages.
"Top 10 Tokenization Techniques for NLP", Eyer, Oct. 12, 2024, Retrieved from internet URL: https://www.eyer.ai/blog/top-10-tokenization-techniques-for-nlp/, 25 pages.
Webster et al., "Tokenization as the initial phase in Nlp", Coling '92: Proceedings of the 14th conference on Computational linguistics, vol. 4, Aug. 23-28, 1992, pp. 1106-1110.
Murel et al., "What are stemming and lemmatization?", IBM, Dec. 10, 2023, Retrieved from internet URL: https://www.ibm.com/think/topics/stemming-lemmatization, 6 pages.
Kevinnjagi, "Lemmatization in NLP", Medium, Oct. 17, 2024, Retrieved from internet URL: https://medium.com/ @kevinnjagi83/lemmatization-in-nlp-2a61012c5d66, Retrieved on Jul. 9, 2025, 12 pages.
"Lemmatization vs. Stemming: A Deep Dive into NLP's Text Normalization Techniques", GeeksforGeeks, Jul. 1, 2024, Retrieved from internet URL: https://www.geeksforgeeks.org/nlp/lemmatization-vs-stemming-a-deep-dive-into-nlps-text-normalization-techniques/, Retrieved on Jul. 9, 2025, 12 pages.
Dunja Mladenic, "Automatic word lemmatization", 7 pages.
Bryan Jurish, "A Hybrid Approach to Part-of-Speech Tagging", 26 pages.
Gildea et al., "Automatic Labeling of Semantic Roles", Computational Linguistics, vol. 28, Issue 3, Sep. 1, 2002, pp. 245-288.
Awwalu et al., "Parts of Speech Tagging: a Review of Techniques", Fudma Journal of Sciences (FJS), vol. 4, Issue 2, Jun. 2020, pp. 712-721.
Derczynski et al., "Twitter Part-of-Speech Tagging for All: Overcoming Sparse and Noisy Data", Proceedings of Recent Advances in Natural Language Processing, Sep. 7-13, 2013, pp. 198-206.
Bao Pham, "Parts of Speech Tagging: Rule-Based", Computer and Information Sciences (CISC), Harrisburg University of Science and Technology, Feb. 19, 2020, 7 pages.
"Prodigy", spaCy, Retrieved from internet URL: https://spacy.io/universe/project/prodigy, Retrieved on Jul. 9, 2025, 3 pages.
"Open Source Data Labeling Platform", Label Studio, Retrieved from internet URL: https://labelstud.io/, Retrieved on Jul. 9, 2025, 8 pages.
"Thematic relation", Wikipedia, Retrieved from internet URL: https://en.wikipedia.org/wiki/Thematic_relation, Retrieved on Jul. 9, 2025, 5 pages.
"Transition guide-Bulk Data Storage System (BDSS)", Available online at https://data.uspto.gov/apis/transition-guide/bdss, Retrieved on Jul. 11, 2025, 1 page.
Shylaja P., "A Review of Computational Biology Approaches in Agriculture", International Conference On Advance It, Engineering and Management, Jun. 30, 2023, 257 pages.
Verma et al., "Chapter 1: Introduction to Supervised Learning", Data Analytics in Bioinformatics: A Machine Learning Perspective, Jan. 18, 2021, 34 pages.
Punuru et al., "Extraction of Non-hierarchical Relations from Domain Texts", 2007 IEEE Symposium on Computational Intelligence and Data Mining, Jun. 4, 2007, pp. 444-449.
Deshmukh et al., "Deep Learning Techniques for Part of Speech Tagging by Natural Language Processing", 2020 2nd International Conference on Innovative Mechanisms for Industry Applications (ICIMIA), Mar. 5-7, 2020, pp. 76-81.
Final Office Action in U.S. Appl. No. 19/027,199 dated Jun. 25, 2025, 24 pages.
Final Office Action in U.S. Appl. No. 19/027,469 dated Jun. 25, 2025, 25 pages.
Final Office Action in U.S. Appl. No. 19/028,561 dated Jun. 25, 2025, 29 pages.
Non-Final Office Action in U.S. Appl. No. 19/027,199 dated Apr. 9, 2025, 19 pages.
Non-Final Office Action in U.S. Appl. No. 19/027,469 dated Apr. 25, 2025, 26 pages.
Non-Final Office Action in U.S. Appl. No. 19/028,561 dated Apr. 14, 2025, 25 pages.
Zimmermann et al., "Approaches to improve preprocessing for Latent Dirichlet Allocation topic modeling", Decision Support Systems, vol. 185, Oct. 2024, 10 pages.

* cited by examiner

600
Client Device
630
Client Application
632
652
GESC
620
buffer
622
UDF
626
Data Store
624
DBMS
628
Control Node
602
650
Worker Node
610

700
receive request for executing a project
702
receive request for grid computing environment to execute project?
704
initiate and execute project in gridded environment & perform data analysis
706
transmit results of analysis
708
initiate and execute project in solo environment
710
provide results of project
712

900
instantive event stream processing engine 900
create engine container 902
instantiate continuous queries 904
initialize publish/subscribe capability 906
start projects 908
receive event block 910
process event block 912
output processed event block 914
stop processing? 916
no
yes
stop projects 918
shutdown 920

1277
1277
neural network configuration data 1293
storage interface 1299
1202
1204
1206
1208
neural network 1200
routine(s) 1244 or neuromorphic device(s) 1250
1222
1255
1222
1255
1222

1300
requesting device(s) 1370
1399
control routine(s) 1354
container 1356
VM 1351
control device 1350
executable routine(s) 1334
container 1336
VM 1331
node device 1330
executable routine(s) 1334
container 1336
VM 1331
node device 1330

1600

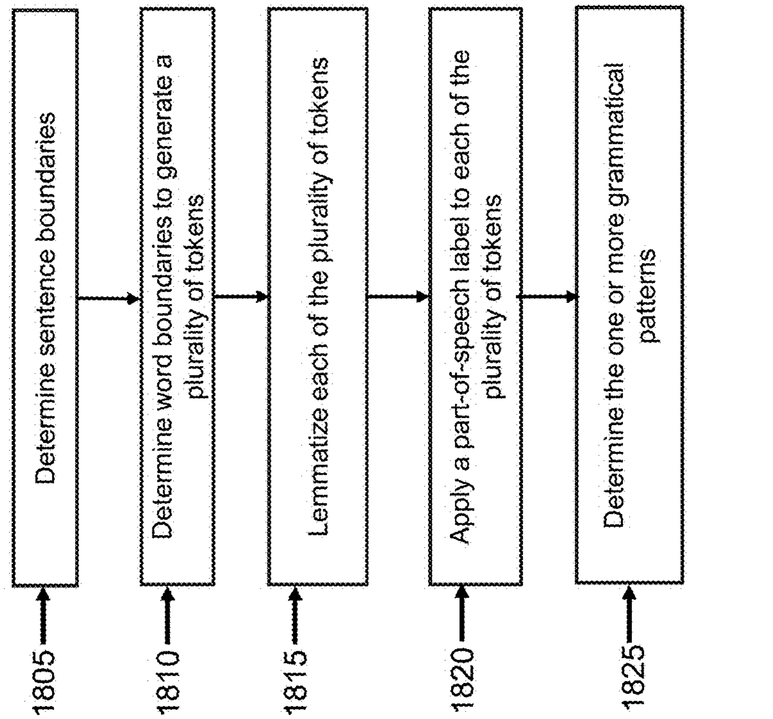
FIG. 18

SYSTEM AND METHOD FOR COMBINING UNSUPERVISED MACHINE LEARNING AND INFORMATION EXTRACTION MODELS FOR TOPIC MODELING

CROSS-REFERENCE TO RELATED APPLICATIONS

This application is a non-provisional of U.S. Provisional Application No. 63/667,303, filed on Jul. 3, 2024, U.S. Provisional Application No. 63/669,341, filed on Jul. 10, 2024, U.S. Provisional Application No. 63/673,873, filed on Jul. 22, 2024, U.S. Provisional Application No. 63/696,449, filed on Sep. 19, 2024, U.S. Provisional Application No. 63/678,191, filed on Aug. 1, 2024, and U.S. Provisional Application No. 63/697,677, filed on Sep. 23, 2024, the entireties of which are incorporated by reference herein.

BACKGROUND

Topic modeling is a technique to discover the main topics or themes in a set of documents without having to manually read through each document. Topic modeling may be used in a wide range of applications. For example, topic modeling may be used to organize a set of documents, making it easy to manage, retrieve, and browse information (for example group articles on a website by topics such as healthcare, politics, fashion, etc.). Topic modeling may also be used for analyzing information. For example, topic modeling may be used to analyze customer feedback and reviews to identify trends, preferences, identifying issues, making recommendations, public opinion, etc. to enable better decision making and improve customer service. Topic modeling may be used academically to analyze a large volume of research papers, identify trends or interesting research subjects, etc. Topic modeling may be used in healthcare to analyze patient data, patient symptoms, clinical notes, etc. Topic modeling may be used in other applications as well. Topic modeling provides a tool for facilitating meaningful inferences from large volumes of unstructured data. However, current topic modeling techniques have limitations.

SUMMARY

In accordance with at least some aspects of the present disclosure, a non-transitory computer-readable medium having computer-readable instructions stored thereon is disclosed. The computer-readable instructions when executed by a processor cause the processor to receive a set of documents from which to generate at least one topic; create at least one information extraction model for the set of documents; execute the at least one information extraction model to extract a plurality of text segments from the set of documents, wherein extracting the plurality of text segments comprises: applying one or more rule sets defined for at least one entity, word list, or grammatical pattern; and extracting a plurality of text portions from the set of documents based on the one or more rule sets as the plurality of text segments; input at least a subset of the plurality of text segments into an unsupervised machine learning model; and execute the unsupervised machine learning model to output the at least one topic for the set of the documents.

In accordance with at least some other aspects of the present disclosure, a system is disclosed. The system includes a memory having computer-readable instructions stored thereon and a processor that executes the computer-readable instructions to receive a set of documents from which to generate at least one topic; create at least one information extraction model for the set of documents; execute the at least one information extraction model to extract a plurality of text segments from the set of documents, wherein extracting the plurality of text segments comprises: applying one or more rule sets defined for at least one entity, word list, or grammatical pattern; and extracting a plurality of text portions from the set of documents based on the one or more rule sets as the plurality of text segments; input at least a subset of the plurality of text segments into an unsupervised machine learning model; and execute the unsupervised machine learning model to output the at least one topic for the set of the documents.

In accordance with at least some other aspects of the present disclosure, a method is disclosed. The method includes receiving, by a processor executing computer-readable instructions stored on a memory, receiving, by a processor executing computer-readable instructions stored on a memory, a set of documents from which to generate at least one topic; creating, by the processor, at least one information extraction model for the set of documents; executing, by the processor, the at least one information extraction model to extract a plurality of text segments from the set of documents, wherein extracting the plurality of text segments comprises: applying, by the processor, one or more rule sets defined for at least one entity, word list, or grammatical pattern; and extracting, by the processor, a plurality of text portions from the set of documents based on the one or more rule sets as the plurality of text segments; inputting, by the processor, at least a subset of the plurality of text segments into an unsupervised machine learning model; and executing, by the processor, the unsupervised machine learning model to output the at least one topic for the set of the documents.

The foregoing summary is illustrative only and is not intended to be limiting in any way. In addition to the illustrative aspects, embodiments, and features described above, further aspects, embodiments, and features will become apparent by reference to the following drawings and the detailed description.

BRIEF DESCRIPTION OF THE DRAWINGS

FIG. 18 illustrates a flowchart outlining example operations for determining grammatical patterns from the set of documents of FIG. 15 for identifying the key information of FIG. 17, according to embodiments of the present technology.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skills in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
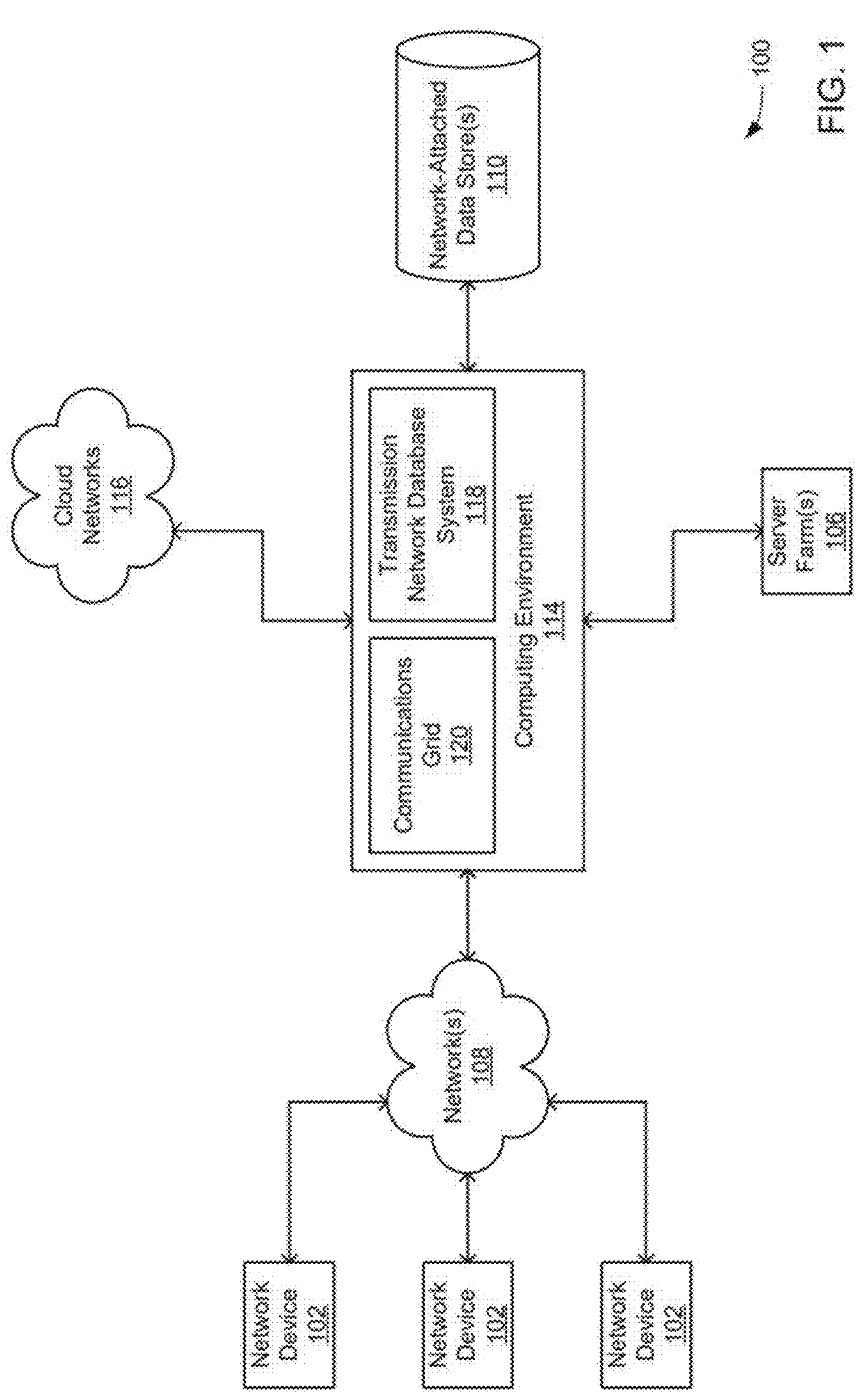
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
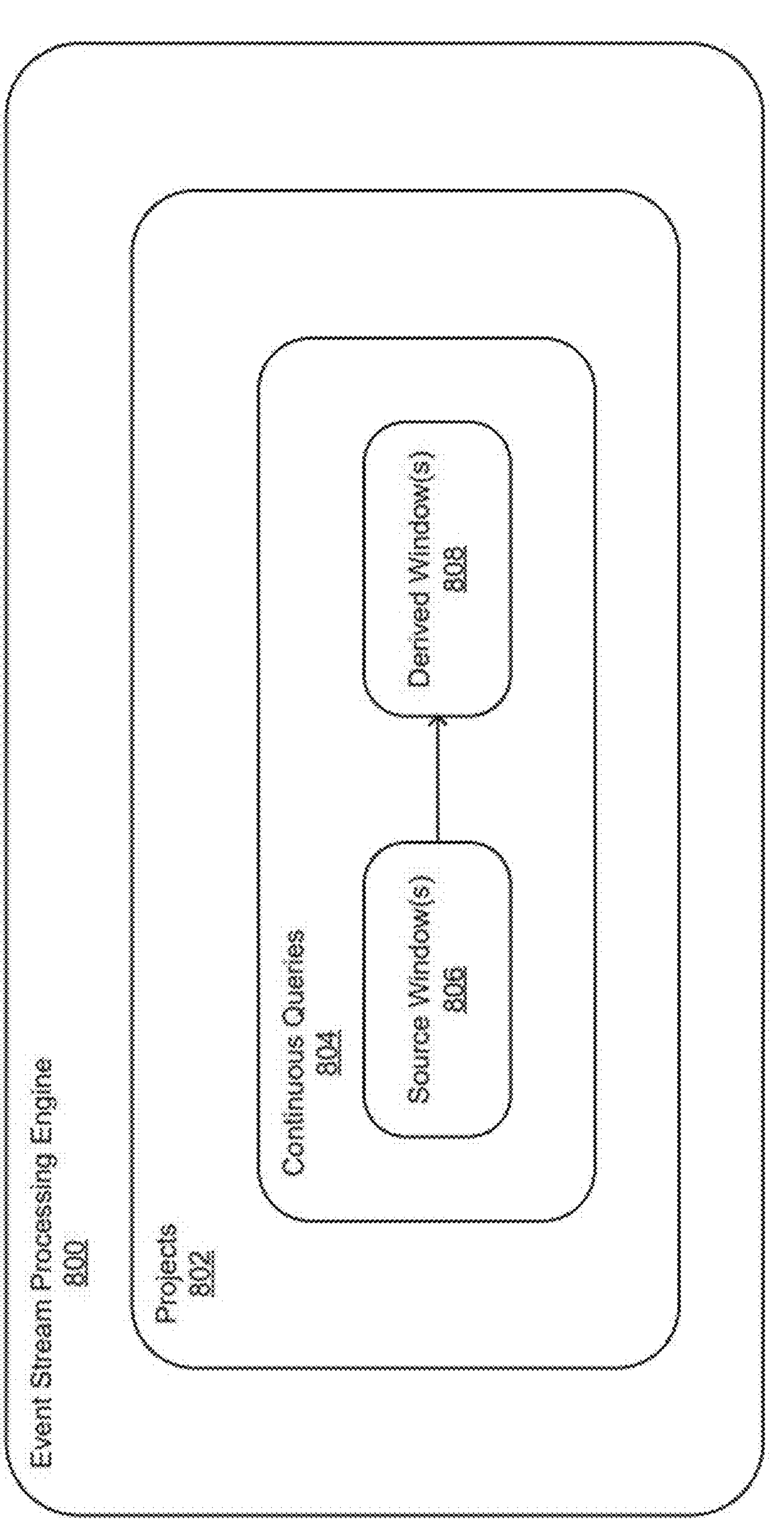
FIG. 8 illustrates a block diagram including components of an Event Stream Processing Engine (ESPE), according to embodiments of the present technology.
Figure 9:
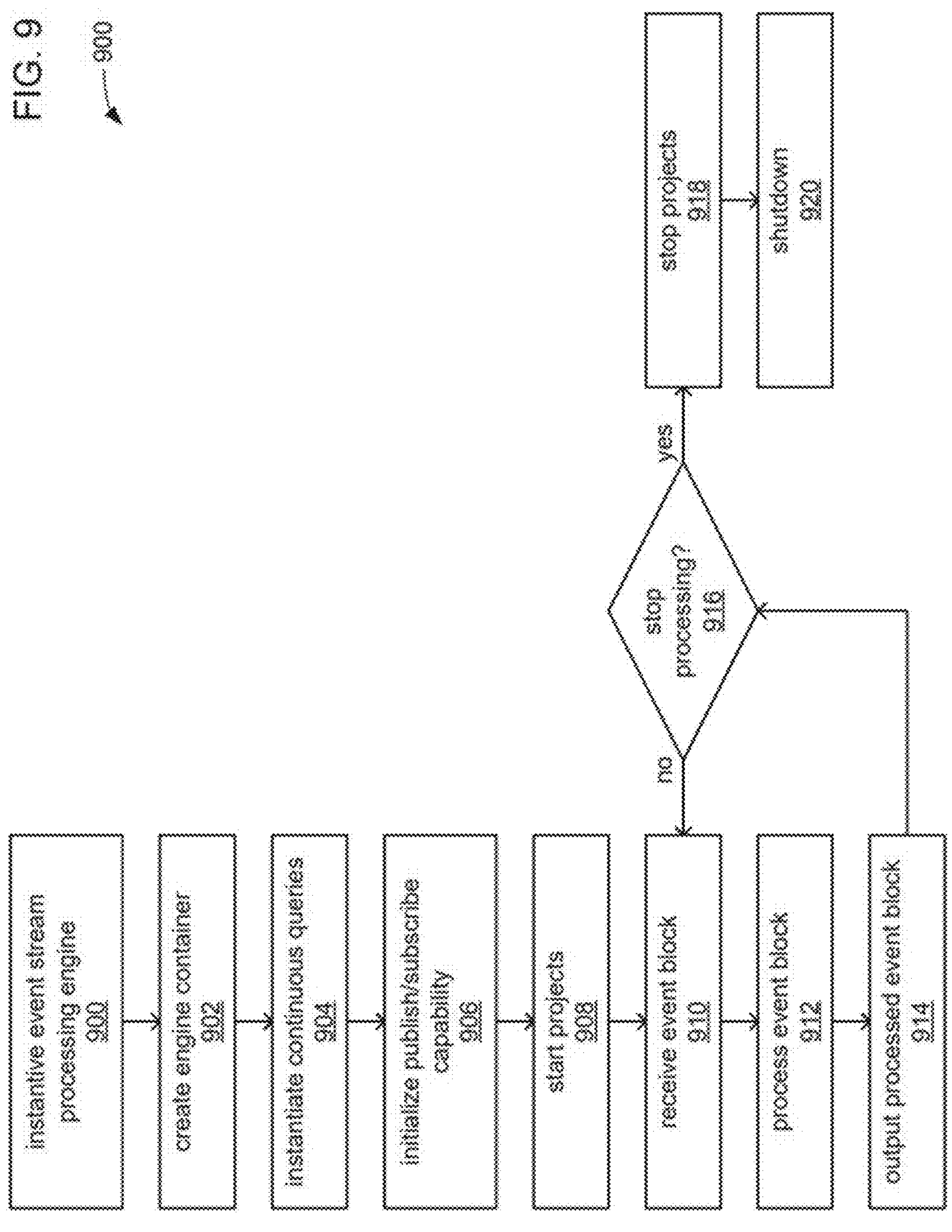
FIG. 9 illustrates a flow chart showing an example process including operations performed by an event stream processing engine, according to some embodiments of the present technology.
Figure 10:
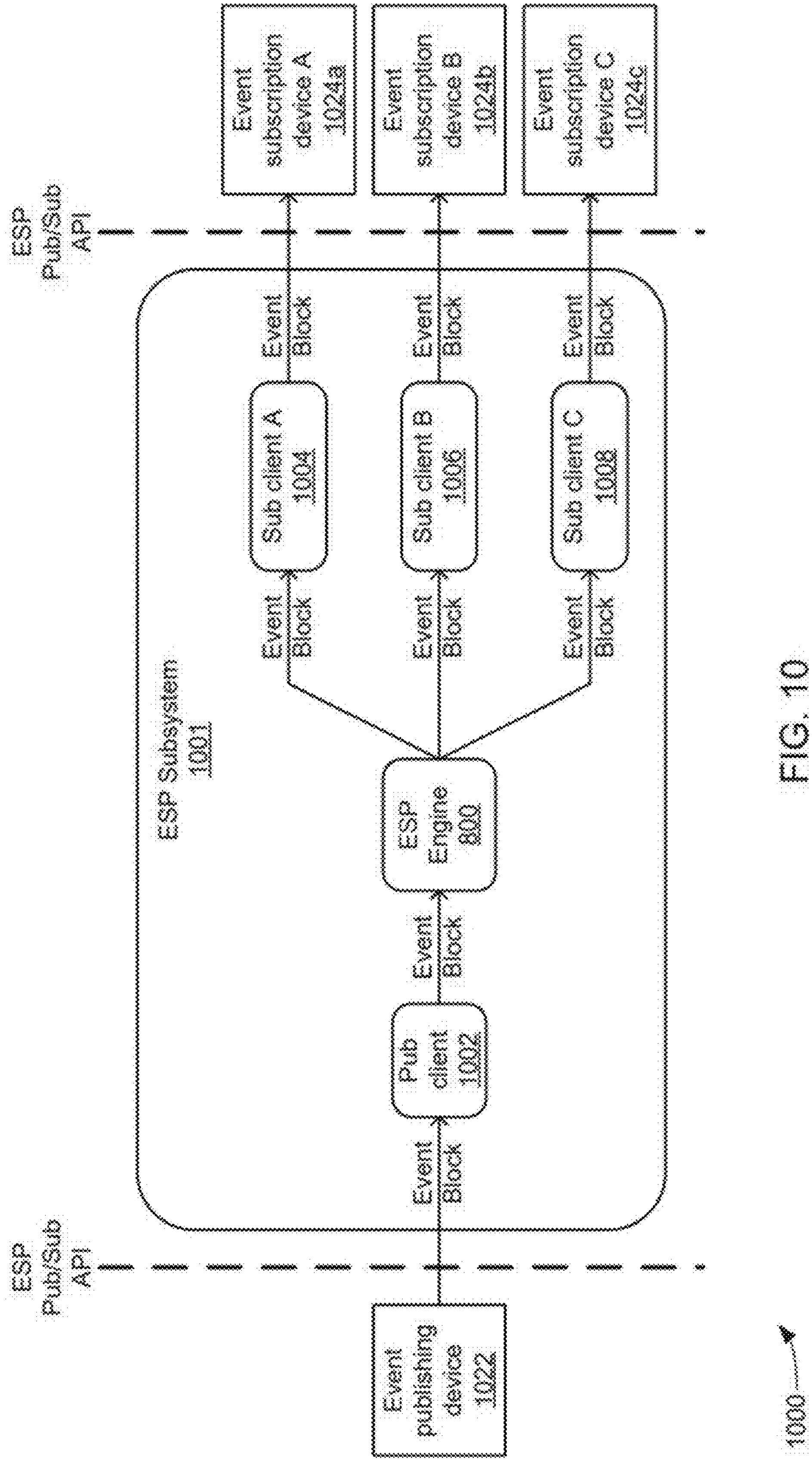
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
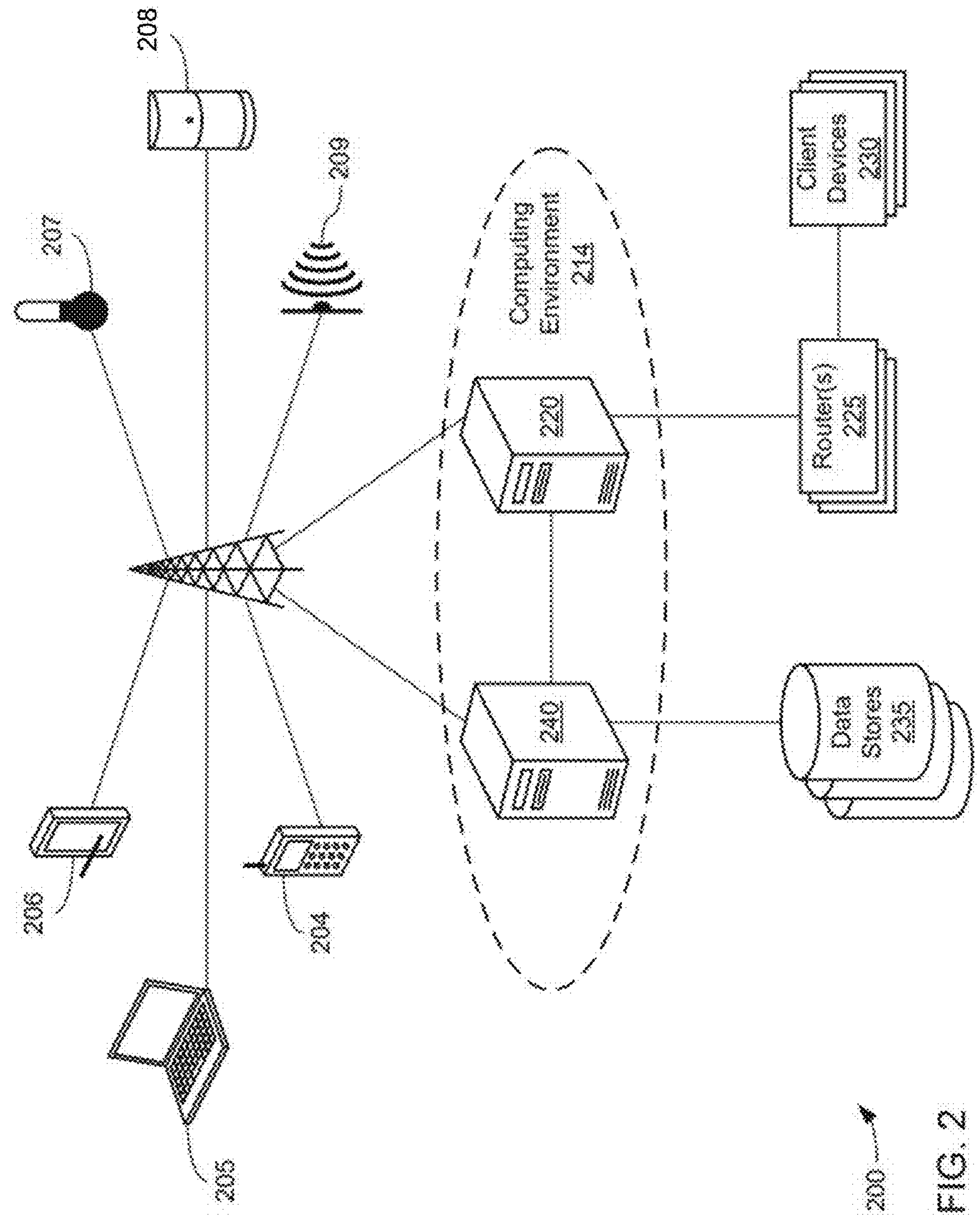
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
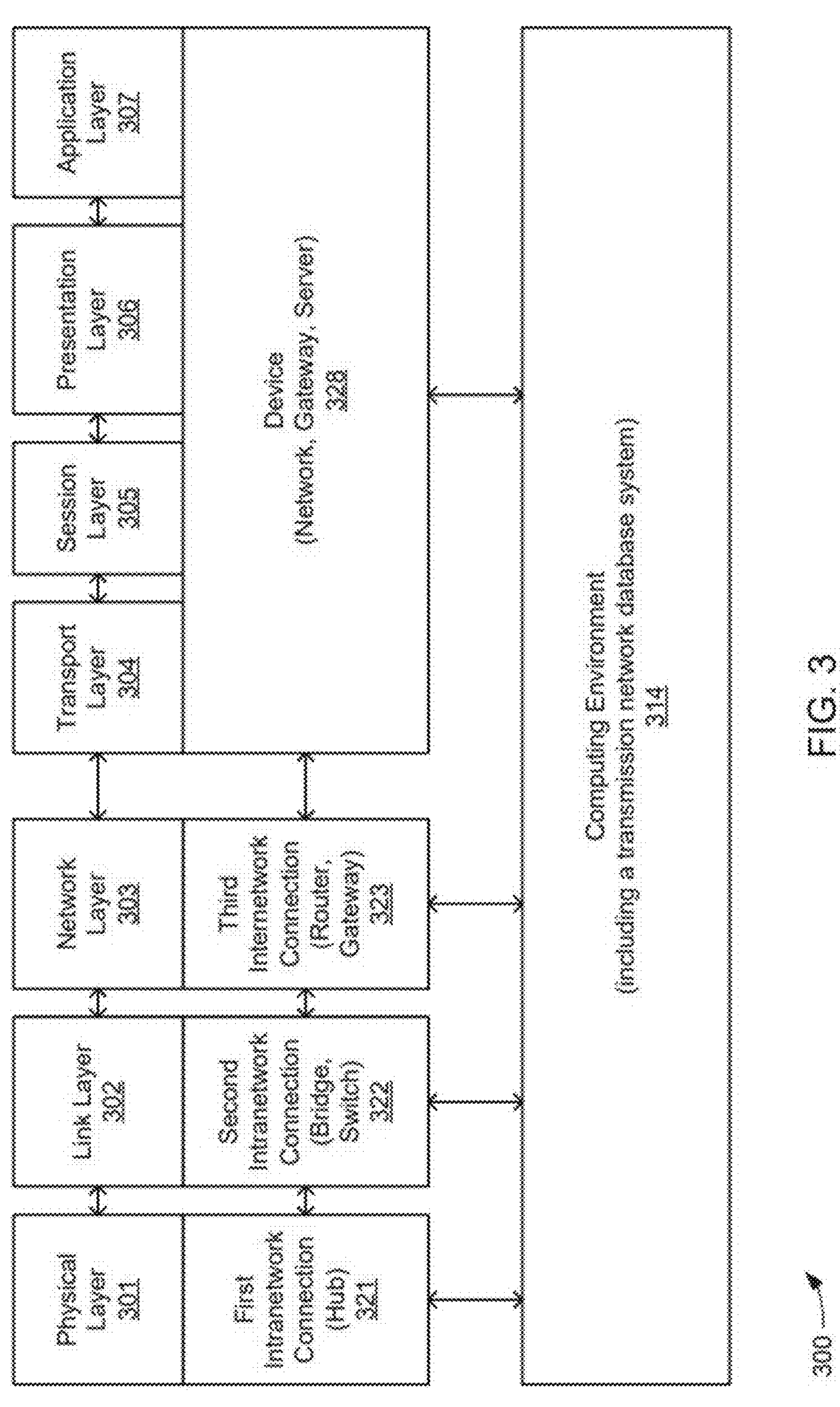
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Internetwork connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
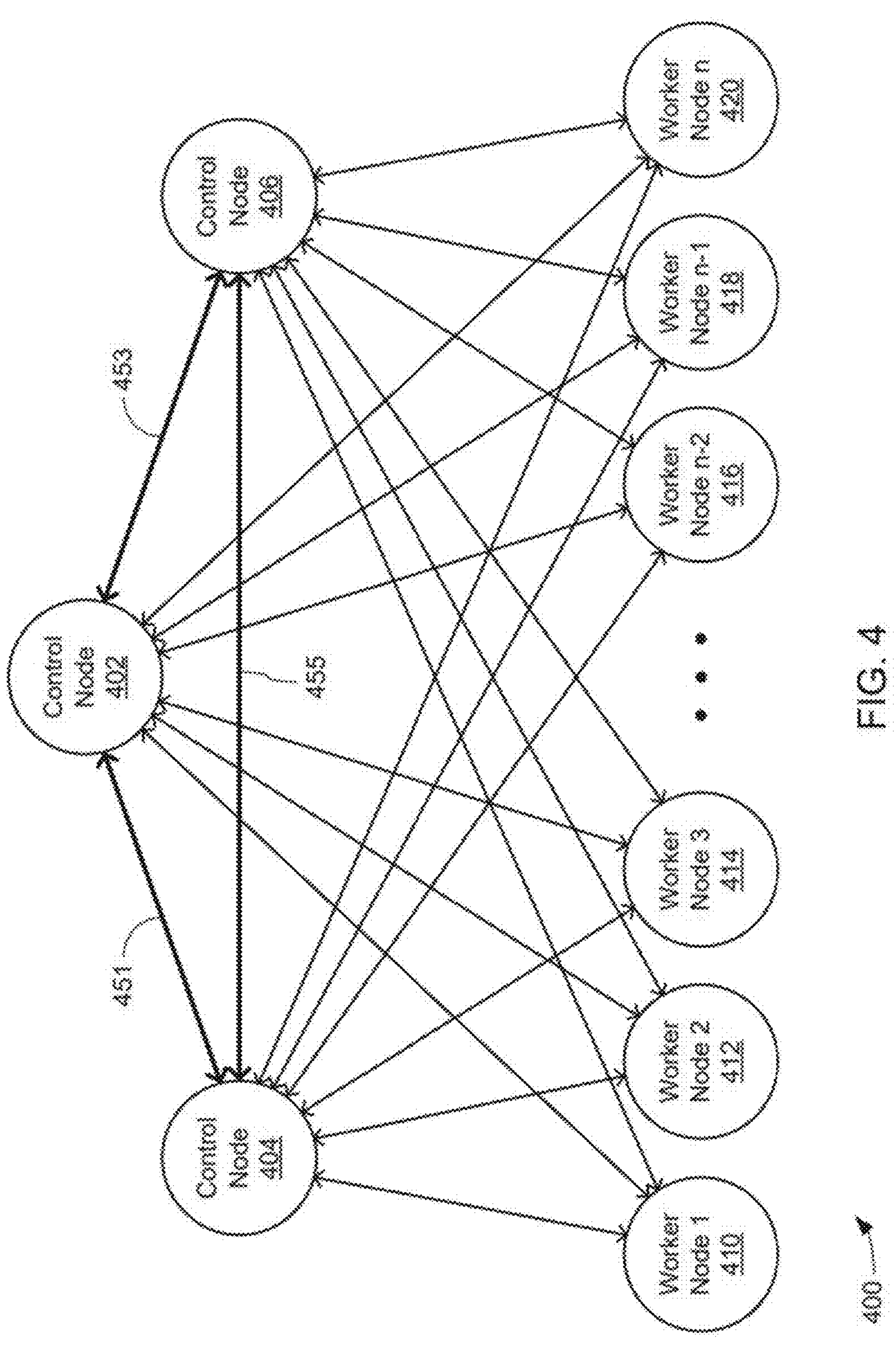
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and restart the project from that checkpoint to minimize lost progress on the project being executed.

Figure 5:
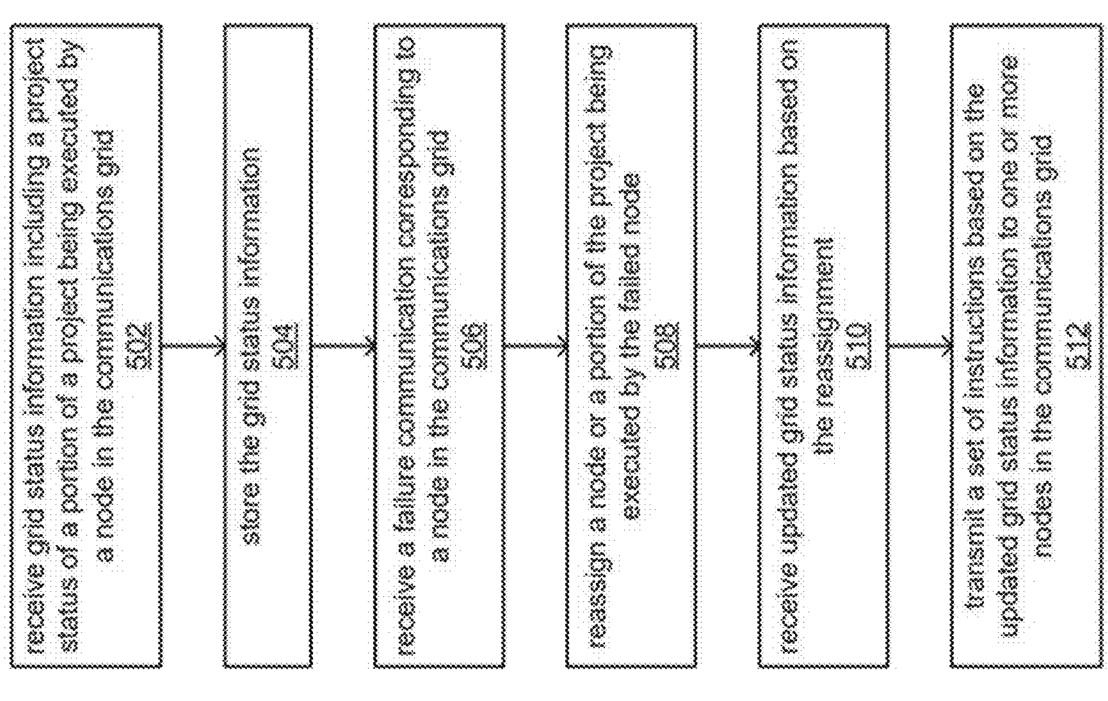
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
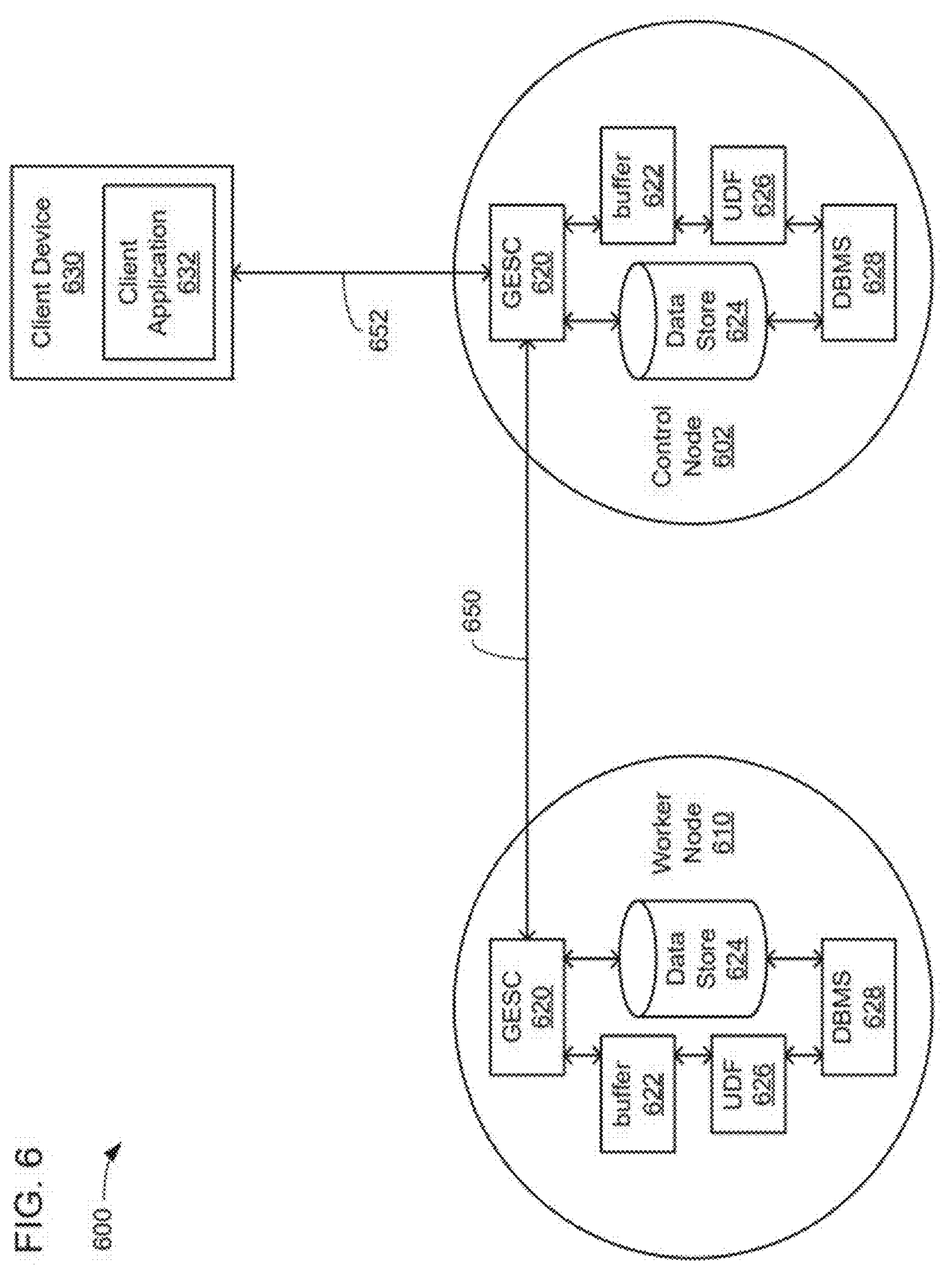
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a node 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
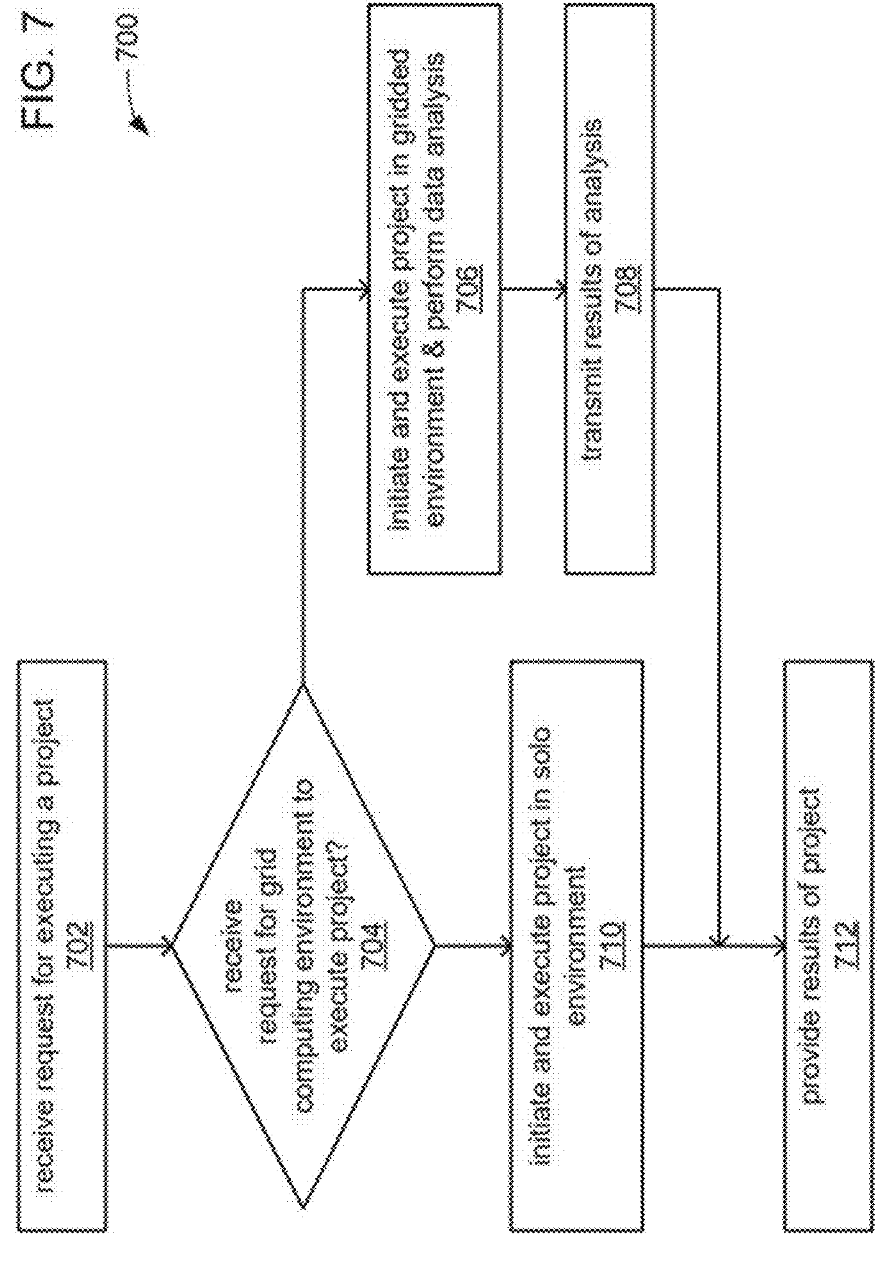
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
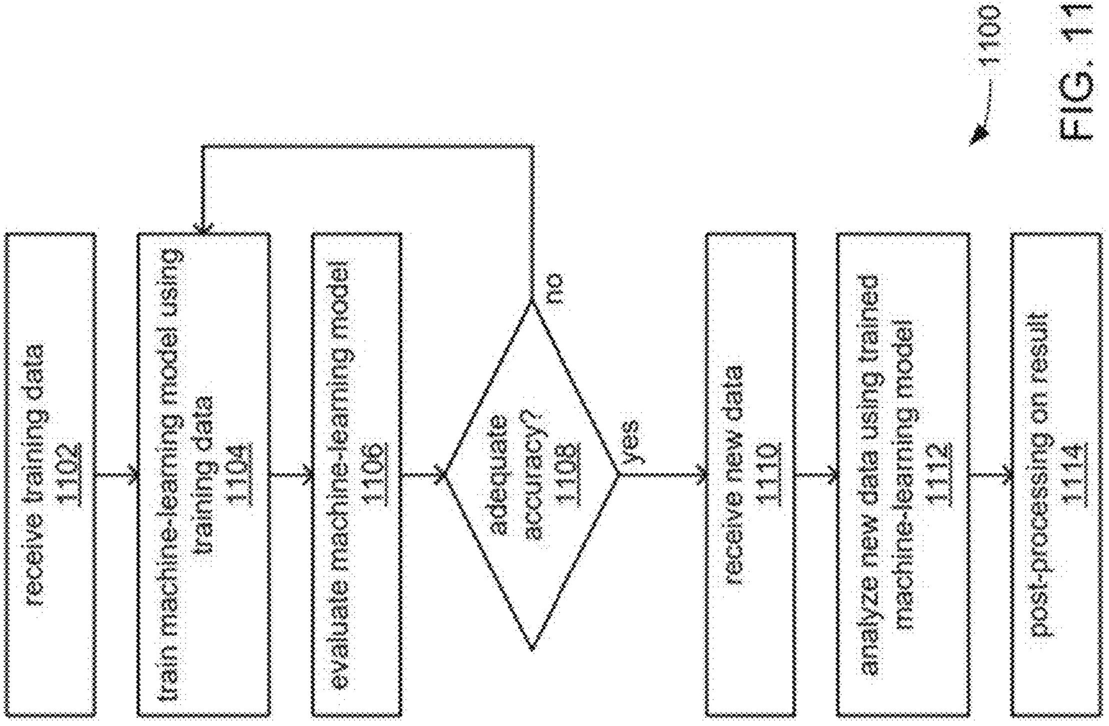
FIG. 11 illustrates a flow chart of an example of a process for generating and using a machine-learning model according to some aspects, according to embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bidirectional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these. Other networks may include transformers, large language models (LLMs), and agents for LLMs.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
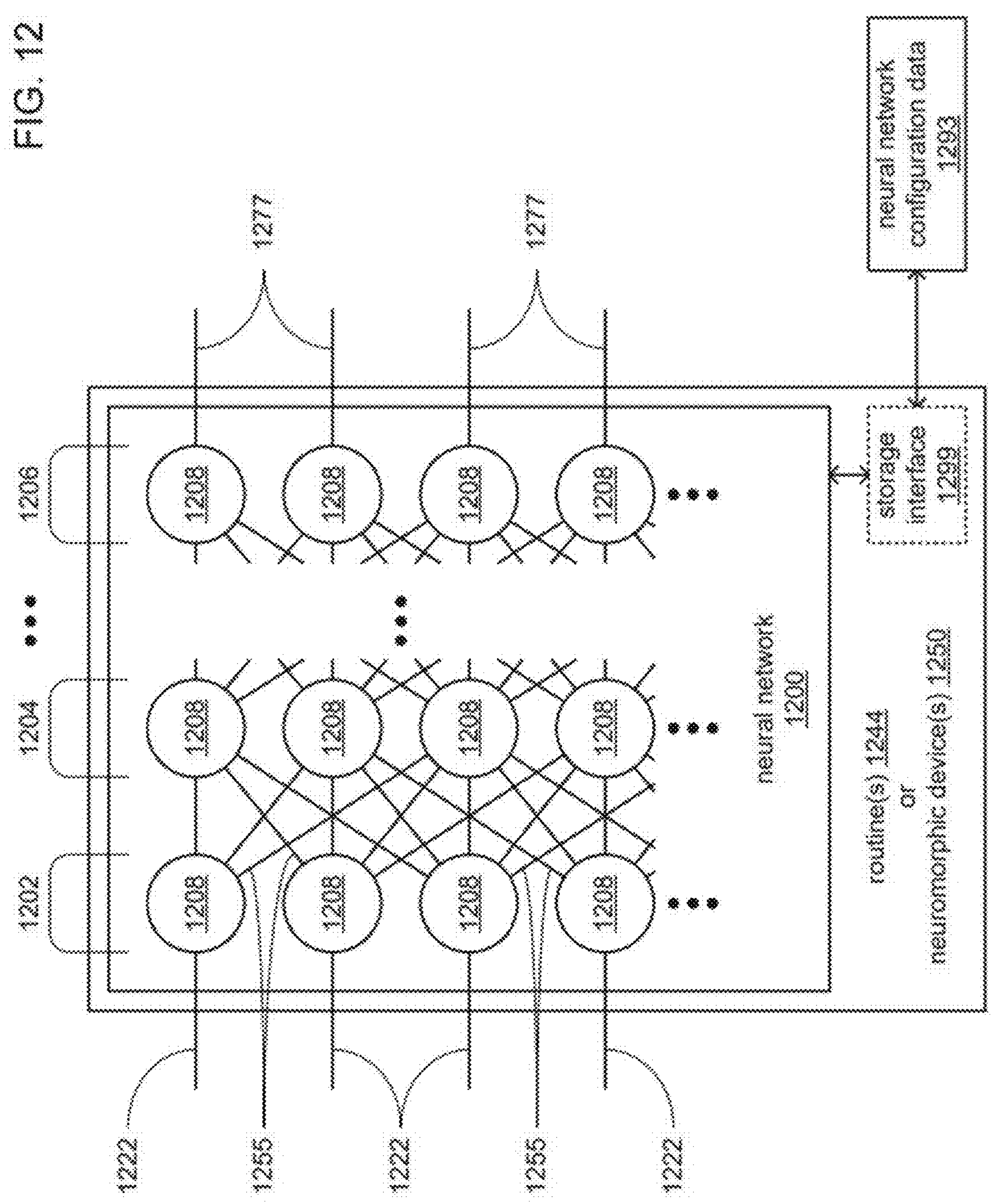
FIG. 12 illustrates an example of a machine-learning model as a neural network, according to embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyper parameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network and/or a transformer model to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
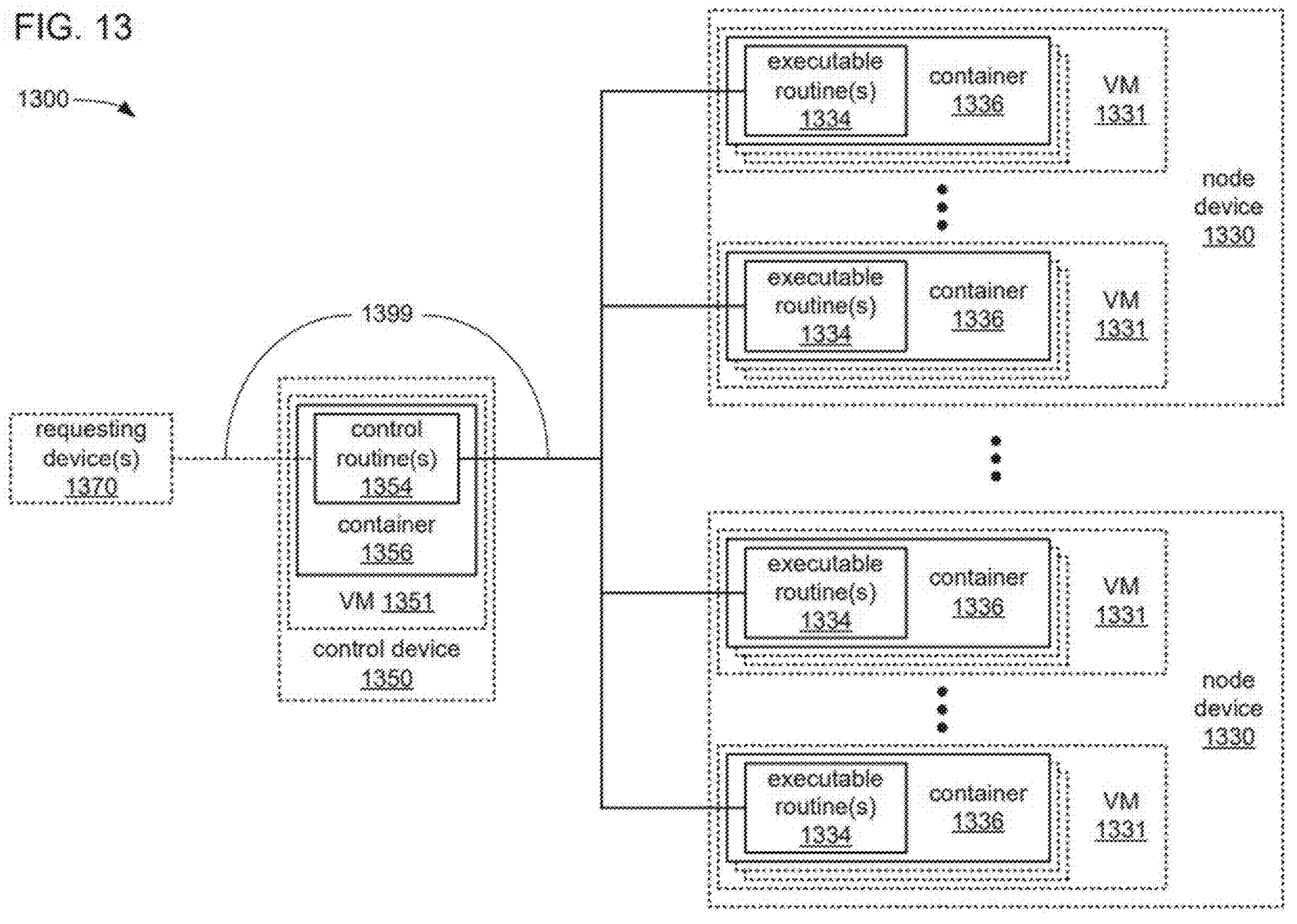
FIG. 13 illustrates various aspects of the use of containers as a mechanism to allocate processing, storage and/or other resources of a processing system to the performance of various analyses, according to embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to affect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the afore-described example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Cloud Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

The present disclosure is directed to topic modeling. Topic modeling is a type of statistical modeling used to discover topics within a collection of documents. Topic modeling is particularly useful for large volumes of textual data. Discovering topics in a large collection (e.g., thousands) of documents may assist with identifying themes and patterns in large sets of textual data without having to manually review and analyze the textual data. Topic modeling may also assist with identifying hidden topics that may be difficult to identify manually, particularly in a large collection of documents. Statistical topic modeling may play an important role in areas such as text mining, natural language processing, information retrieval, etc. Common topic modeling algorithms include Latent Dirichlet Allocation (LDA), Probabilistic Latent Semantic Analysis (pLSA), and Singular Value Decomposition (SVD), among others. These algorithms model sets of documents as a mixture of topics and each topic is modeled as a probability distribution over words.

In particular, topic modeling may entail inputting a set of documents into an unsupervised machine learning model, such as a topic model. The unsupervised machine learning model may implement LDA, pLSA, SVD, etc. to generate one or more topics for the set of documents. The generated one or more topics may each be defined by sets of topic terms and weights. For example, each topic may be represented by top N topic words, also referred to herein as topic terms. Each topic term may be associated with a weight value generated by the unsupervised machine learning model. For example, an unsupervised machine learning model may generate one or more topics for a set of documents as follows:

Topic 1: wherein, second, first, surface, mirror

Topic 2: vehicle, control, wheel, unit, driving

Topic 3: said, wherein, second, first, vehicle

In the examples above, the unsupervised machine learning model generates three topics: Topic 1, Topic 2, and Topic 3. Each of these topics is represented by top five topic terms in the example above. For example, Topic 1's topic terms are "wherein, second, first, surface, mirror," Topic 2's topic terms are "vehicle, control, wheel, unit, driving," and Topic 3's topic terms are "said, wherein, second, first, vehicle." Although only five top topic terms are shown in the example above, the number of topics terms that the unsupervised machine learning model generates for each topic may be configurable. Further, although not shown, each topic term may be associated with a weight value.

Conventionally, full documents are input into the topic model to generate topics. When using full documents to discover topics through unsupervised machine learning methods, each individual word in a document has the same chance to be an important marker for each topic. The topics generated from such methods may generate topic terms that may be important words indicating key content or themes in the full documents or may be less important words having no relevance to the actual topics of the full documents. In other words, when full documents are used to generate topics through unsupervised machine learning methods, the topic terms that are generated may or may not be relevant, domain-aware, and/or include key phrases from the documents. Thus, topics generated by conventional topic modeling may or may not reflect the actual topics in the documents. In other words, topics generated by conventional topic modeling may vary substantially in focus and interpretability.

In some cases, it may be more useful or desirable to generate topics whose topic terms include a set of domain-aware key terms and/or key phrases in the set of documents. However, with current topic modeling techniques, generating topic terms that include domain-aware key terms and/or certain key phrases is not possible. The proposed approach provides a mechanism to generate more focused topics. In particular, the proposed approach provides a mechanism to leverage an Information Extraction (IE) model to identify relevant text segments from the set of documents. The relevant text segments may be representative of the domain-aware key terms and/or key phrases from the set of documents.

In particular, the proposed approach uses an IE model to automatically extract structured information from unstructured or semi-structured data. Thus, an IE model may be used to extract key elements of the set of documents. The key elements may represent key content or key information in a document. For example, key information in a text may be found in named entities, noun phrases, and verb phrases, as these elements may carry important or relevant meaning. The key information may be domain specific. A domain may refer to a knowledge domain such as a particular industry or subject matter. For example, when the set of documents relate to automobile industry, the IE model may be used to extract automobile industry specific or relevant text segments from the set of documents. These extracted text segments may then be used to generate topics (e.g., topic terms) through use of an unsupervised machine learning model that are relevant to or suitable for the automobile industry and thus more accurately represent the topic disclosed in the set of documents. Thus, instead of inputting full documents into a topic model, the proposed approach provides a mechanism to intelligently select the key information form each of the set of documents and only use the extracted information for topic modeling.

To allow the IE Model to extract domain-aware key terms and/or key phrases from the set of documents, the present disclosure provides a mechanism to build a suitable IE model that may be used in conjunction with topic modeling to generate more focused topics. The IE model leverages a Subject-Predicate-Object (SPO) structure as a fundamental representation in the IE model, enabling the transformation of unstructured text into structured, machine-readable data. The IE model that is built may be configured to extract relationships and/or dependencies from the set of documents. Further, in some embodiments, the IE model may be augmented with context information to represent the key text segments of a document. Thus, the built IE model is a domain-agnostic IE model to extract the SPO structure along with the text between elements (e.g., context), providing a more complete representation of the relevant information in the set of documents.

The built IE model may, thus, be configured to extract relevant information from the set of documents. In particular, the IE model is configured to extract a plurality of text segments that include relevant, important, or otherwise key information from the set of documents. The extracted plurality of text segments is then input into an unsupervised machine learning model to generate more focused topics. The topics generated may then be used for a variety of purposes. For example, in some embodiments, the generated topics may be used to generate compressed prompts to a language model (e.g., a Large Language Model (LLM)), as discussed in U.S. application Ser. No. 19/027,199, filed on Jan. 17, 2025, the entirety of which is incorporated by reference herein. The generated topics may also be used to generate summaries of the set of documents using a language model, as discussed in U.S. application Ser. No. 19/202,283 filed May 8, 2025, the entirety of which is also incorporated by reference herein. The generated topics mya be used to generate sentiment for the set of documents.

The present disclosure cannot be practically performed in the human mind. Nor can it be practically performed using pen and paper. Real-world applications may have thousands or millions of documents for topic modeling. A human mind is incapable of practically analyzing the large volume of textual data to generate a clear, concise, and relevant topics in a reasonable amount of time. The concepts of the present disclosure are not directed to any observations, evaluations, judgments, or opinions that a human mind can practically perform. Given that an unsupervised machine learning model is needed to identify the topics and an IE model is needed to extract the relevant text segments, a computing unit is needed to perform the operations herein. Further, the present disclosure does not recite a mathematical concept but is rather based on or involves mathematical concepts. In other words, the present disclosure is not directed to mathematical relationships, any specific mathematical formulas or equations, or any particular mathematical calculations. Rather, the present disclosure is directed to systems and methods that use a novel topic modeling technique in a non-conventional manner for generating topics for a set of documents.

Figure 14:
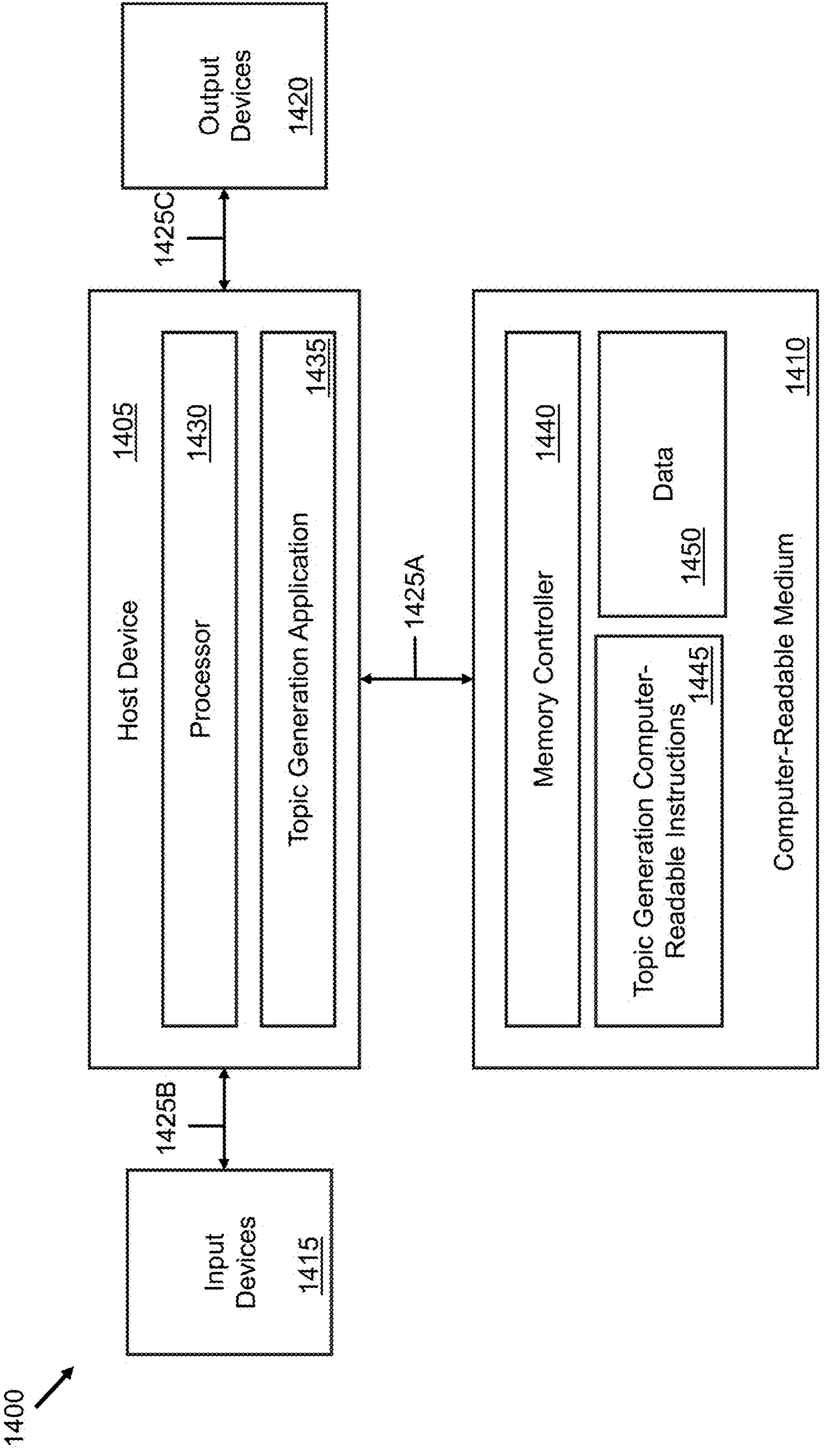
FIG. 14 illustrates a block diagram of an example topic generation system, according to embodiments of the present technology.

Turning now to FIG. 14, a block diagram of an example topic generation system 1400 is shown, in accordance with some embodiments of the present disclosure. The topic generation system 1400 may be part of, or otherwise associated with, the computing environment 114. The topic generation system 1400 includes a host device 1405 associated with a computer-readable medium 1410. The host device 1405 may be configured to receive input from one or more input devices 1415 and provide output to one or more output devices 1420. The host device 1405 may be configured to communicate with the computer-readable medium 1410, the input devices 1415, and the output devices 1420 via appropriate communication interfaces, buses, or channels 1425A, 1425B, and 1425C, respectively. The topic generation system 1400 may be implemented in a variety of computing devices such as computers (e.g., desktop, laptop, etc.), servers, tablets, personal digital assistants, mobile devices, wearable computing devices such as smart watches, other handheld or portable devices, or any other computing units suitable for performing operations described herein using the host device 1405.

Further, some or all of the features described in the present disclosure may be implemented on a client device, an on-premise server device, a cloud/distributed computing environment, or a combination thereof. Additionally, unless otherwise indicated, functions described herein as being performed by a computing device (e.g., the topic generation system 1400) may be implemented by multiple computing devices in a distributed environment, and vice versa.

The input devices 1415 may include any of a variety of input technologies such as a keyboard, stylus, touch screen, mouse, track ball, keypad, microphone, voice recognition, motion recognition, remote controllers, input ports, one or more buttons, dials, joysticks, point of sale/service devices, card readers, chip readers, and any other input peripheral that is associated with the host device 1405 and that allows an external source, such as a user, to enter information (e.g., data) into the host device and send instructions to the host device 1405. Similarly, the output devices 1420 may include a variety of output technologies such as external memories, printers, speakers, displays, microphones, light emitting diodes, headphones, plotters, speech generating devices, video devices, and any other output peripherals that are configured to receive information (e.g., data) from the host device 1405. The "data" that is either input into the host device 1405 and/or output from the host device may include any of a variety of textual data, numerical data, alphanumerical data, graphical data, video data, sound data, position data, combinations thereof, or other types of analog and/or digital data that is suitable for processing using the Topic generation system 1400.

The host device 1405 may include a processor 1430 that may be configured to execute instructions for running one or more applications associated with the host device 1405. In some embodiments, the instructions and data needed to run the one or more applications may be stored within the computer-readable medium 1410. The host device 1405 may also be configured to store the results of running the one or more applications within the computer-readable medium 1410. One such application on the host device 1405 may be a topic generation application 1435. The topic generation application 1435 may be used to generate one or more topics from a set of documents.

The topic generation application 1435 may be executed by the processor 1430. The instructions to execute the topic generation application 1435 may be stored within the computer-readable medium 1410. To facilitate communication between the host device 1405 and the computer-readable medium 1410, the computer-readable medium may include or be associated with a memory controller 1440. Although the memory controller 1440 is shown as being part of the computer-readable medium 1410, in some embodiments, the memory controller may instead be part of the host device 1405 or another element of the topic generation system 1400 and operatively associated with the computer-readable medium 1410. The memory controller 1440 may be configured as a logical block or circuitry that receives instructions from the host device 1405 and performs operations in accordance with those instructions. For example, to execute the topic generation application 1435, the host device 1405 may send a request to the memory controller 1440. The memory controller 1440 may read the instructions associated with the topic generation application 1435. For example, the memory controller 1440 may read topic generation instructions 1445 stored within the computer-readable medium 1410 and send those instructions back to the host device 1405. In some embodiments, those instructions may be temporarily stored within a memory on the host device 1405. The processor 1430 may then execute those instructions by performing one or more operations called for by those instructions.

The computer-readable medium 1410 may include one or more memory circuits. The memory circuits may be any of a variety of memory types, including a variety of volatile memories, non-volatile memories, or a combination thereof. For example, in some embodiments, one or more of the memory circuits or portions thereof may include NAND flash memory cores. In other embodiments, one or more of the memory circuits or portions thereof may include NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the computer-readable medium 1410. In some embodiments, one or more of the memory circuits or portions thereof may be configured as other types of storage class memory ("SCM"). Generally speaking, the memory circuits may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The computer-readable medium 1410 may also be configured to store data 1450. The data 1450 may include an input set of documents. The data 1450 may also include one or more topics generated from the input set of documents by an unsupervised machine learning model. The data 1450 may also include model descriptions and other information needed to implement and execute one or more machine learning models. The data 1450 may further include any other data or information that is needed by the topic generation application 1435 to perform operations described herein. Additionally, the data 1450 may include information (e.g., text segments) extracted from the set of documents by an IE model.

It is to be understood that only some components of the topic generation system 1400 are shown and described in FIG. 14. However, the topic generation system 1400 may include other components such as various batteries and power sources, networking interfaces, routers, switches, external memory systems, controllers, etc. Generally speaking, the topic generation system 1400 may include any of a variety of hardware, software, and/or firmware components that are needed or considered desirable in performing the functions described herein. Similarly, the host device 1405, the input devices 1415, the output devices 1420, and the computer-readable medium 1410, including the memory controller 1440, may include hardware, software, and/or firmware components that are considered necessary or desirable in performing the functions described herein.

Figure 15:
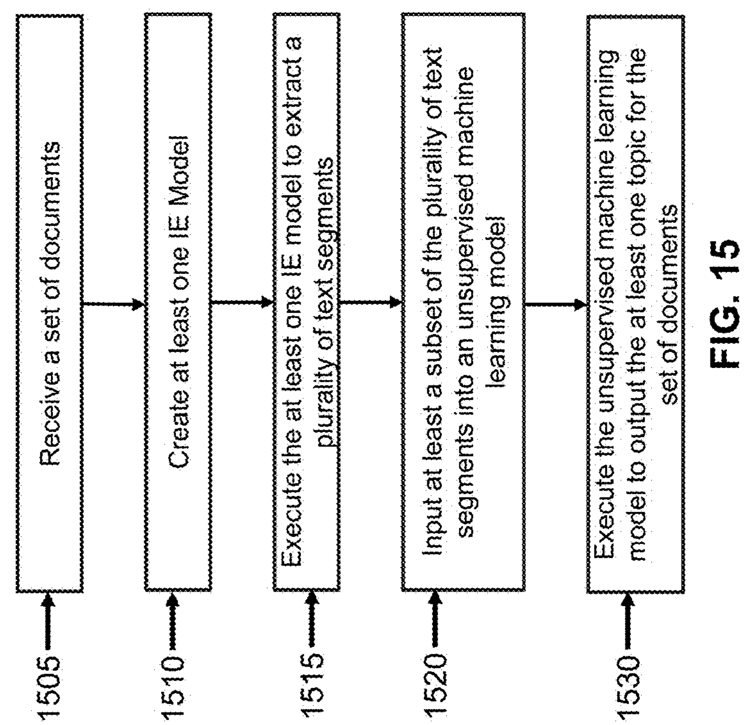
FIG. 15 illustrates a flowchart outlining example operations for generating topics for a set of documents using the topic generation system of FIG. 14, according to embodiments of the present technology.

Referring now to FIG. 15, an example flowchart outlining operations of a process 1500 is shown, in accordance with some embodiments of the present disclosure. The process 1500 may be executed by one or more processors (e.g., the processor 1430) executing computer-readable instructions (e.g., the topic generation computer-readable instructions 1445) associated with the topic generation application 1435. The process 1500 may be used for generating one or more topics from a set of documents. The process 1500 may include other or additional operations in other embodiments.

At operation 1505, the processor receives a set of documents from which to generate one or more topics. In some embodiments, the set of documents may include one or more articles such as research papers, dissertations, newspapers, magazines, news, etc., customer reviews, social media posts, emails, legal documents such as contracts, patents, court filings, etc., healthcare records, books, novels, or other literary works, transcripts, reports, survey responses, cash register receipts, transcribed data, and/or any type of written record or collection of data from which a topic may be desired and which may be converted into textual data. In some embodiments, data other than written records may be used. When non-textual data is to be used, the non-textual data may be converted into textual form. For example, in some embodiments, video data, audio data, image data, scanned data, etc. that is readily not technically textual data, may be converted into textual data for generating topics therefrom. In some embodiments, image processing tools may be used to convert non-textual information into textual information. For example, in some embodiments, image processing tools may be used to detect patterns, formatting, locations, etc. of certain types of information (e.g., headings, first couple of sentences in each paragraph, beginning and ending of a document, etc.) and extract the detected information into a new document. The new document may be added to the set of documents. In some embodiments, the image processing tools may be implemented as IE models. In other embodiments, the image processing tools may be other suitable tools.

The number of documents in the set of documents may vary as well. In some embodiments, the number of documents in the set of documents may be dependent on the type of models that are being used to generate topics. In some embodiments, unsupervised machine learning models may have a maximum number of tokens that they may receive as inputs (and generate as outputs). A "token" may be considered a fundamental unit of information that a model may process. Each token may include one or more characters. For example, in some embodiments, a token may include a word. In some embodiments, a token may include a subword (e.g., half a word). In some embodiments, a token may include spaces or special characters, images, etc. In general, a textual document may be broken down into a plurality of tokens and the plurality of tokens may be processed by a machine learning model. The number of tokens may limit the number of documents that may be input into those unsupervised machine learning models. In some embodiments, the number of documents in the set of documents may be equal to or greater than 500 documents. In other embodiments, the number of documents in the set of documents may vary as desired. Further, in some embodiments, the set of documents may include full documents, portions of documents, summaries of documents, and/or a combination thereof.

In some embodiments, the processor may receive the set of documents via one or more selections made through a user interface (e.g., a display associated with the output devices 1420). For example, in some embodiments, a user may provide, via a user interface, one or more selections indicating the location (e.g., file path) where the set of documents are stored. In response to the selection, the processor may retrieve the set of documents from that location. In some embodiments, the set of documents may be provided as streaming data. Using streaming data may be advantageous when the data includes sensitive or transient information. In such situations, the relevant information may be extracted from the streaming data without needing to store the entire data, thereby preserving and safeguarding the sensitive or transient nature of the data. In some embodiments, using streaming log data may be used where only certain aspects of information from the log data are relevant. In such situations, the relevant portions of data may be extracted from the log data without needing to save the entire log data. In some embodiments, streaming data may be used where data is generated in real-time, for example, in social media context. In such cases, relevant comments may be extracted as those comments are generated, without needing to save entire conversations or data from social media. In some embodiments, the streaming data may be used in the context of ESP described above. In some embodiments, the set of documents may be provided as non-streaming data. In some embodiments, the set of documents may be directly uploaded.

At operation 1510, the processor creates at least one IE model for the set of documents received at the operation 1505. In some embodiments, the processor may input the set of documents into an IE model. An IE model is configured to automatically extract structured information from unstructured or semi-structured text. Thus, in some embodiments, the IE model may be configured to extract information from the set of documents received at the operation 1505. The IE model may be created to extract certain information from the set of documents. For example, in some embodiments, the IE model may be created to extract a text segment highlighting key information about the document. In some embodiments, the IE model may be created to extract other or additional information such as key entities (e.g., people, organizations, dates, etc.), relationships between entities, etc., from the set of documents. Thus, in some embodiments, the IE model may be created to extract one or more text segments from the set of documents.

In some embodiments, the IE model may be a rule-based model. A rule-based IE model may rely on predefined patterns and rules to extract the relevant information (e.g., text segments). Unlike machine learning models, which learn from data, rule-based models use predefined rules to identify and extract information from the set of documents. For example, in some embodiments, a rule-based IE model may use pattern matching rules to identify specific sequences of text that match predetermined patterns predefined in the pattern matching rules. In some embodiments, a rule-based IE model may use linguistic rules that apply grammatical and syntactic rules to understand structure of text and identify text based on those rules. In some embodiments, a rule-based IE model may use domain-specific rules that include rules relevant to a specific domain or application (e.g., medical, legal, finance, etc.). In some embodiments, a rule-based IE model may use a combination of one or more of the pattern matching rules, linguistic rules, and domain-specific rules. In other embodiments, a rule-based IE model may use other, different, or additional types of rules. Examples of rule-based models that may be used herein may include General Architecture for Text Engineering (GATE) model, Stanford TokensRegex model, Apache Unstructured Information Management Architecture (UIMA) model, SpaCy's Matcher model, SAS Visual Text Analytics concepts model, etc.

In some embodiments, the IE model may be a machine learning (ML) model. An ML model may be configured to automatically learn patterns and features from the data itself to extract structured information from unstructured text. Unlike rule-based models, which rely on predefined rules to extract relevant information, ML models learn autonomously from the data (e.g., the set of documents) to extract the relevant information. In some embodiments, examples of ML models that may be used herein may include supervised learning models such as Named Entity Recognition (NER) model for identifying and classifying entities in text, Relation Extraction models like Support Vector Machines for identifying relationships between entities, Event Extraction models such as Recurrent Neural Networks (RNNs) and Transformers to identify events and associated participants, etc. In some embodiments, examples of ML models that may be used herein may also include semi-supervised learning models that may use a combination of labeled and unlabeled data to improve extraction performance, deep learning models like Bidirectional Encoder Representations from Transformers (BERT), Generative Pre-Trained Transformers (GPT), or other transformers to identify complex textual patterns, Sequence-to-Sequence models such as RNNs or transformer models for tasks like summarization and translation, etc. In some embodiments, examples of ML models that may be used herein may also include extractive summarization models that may be configured to generate summaries of text. In other embodiments, examples of ML models that may be used herein may include other, additional, or different models. In some embodiments, the machine learning model may be trained for a specific domain or application.

In some embodiments, a combination of one or more rule-based models may be used for the IE model. In some embodiments, a combination of one or more ML models may be used for the IE model. In some embodiments, a combination of one or more rule-based models and one or more ML models may be used. Additional details of rule-based models and ML models may be found in Tang, J., Hong, M., Zhang, D. L. and Li, J., "Information Extraction: Methodologies and Applications", Emerging Technologies of Text Mining: Techniques and Applications (pp. 1-33) (2008), IGI Global, https://doi.org/10.4018/978-1-59904-373-9.ch001; Small S G, Medsker L, "Review of information extraction technologies and applications" (2013) Neural Computing and Applications, 25:33-548; Mooney R J, Bunescu R, "Mining Knowledge from Text Using Information Extraction," ACM SIGKDD Explorations Newsletter, Volume 7, Issue 1 (pp 3-10) (2005), https://doi.org/10.1145/1089815.10898; Jade, Teresa, Biljana Belamaric Wilsey, and Michael Wallis, "SAS® Text Analytics for Business Applications: Concept Rules for Information Extraction Models" (2019) Cary, NC: SAS Institute Inc., the entireties of which are incorporated by reference herein.

Thus, in some embodiments, the at least one IE model used at the operation 1510 may be a rule-based model. In some embodiments, the at least one IE model used at the operation 1510 may be a machine learning model trained for a specific domain or application. In some embodiments, the at least one IE Model used at the operation 1510 may be a combination of a rule-based model and a machine learning model trained for a specific domain or application. Before using the at least one IE model for extracting text segments from the set of documents of the operation 1505, each of the at least one IE Model is created. Creation of the IE model may be based on whether an IE model is rule-based or a machine learning model.

To create the IE model (whether rule-based or machine learning), the processor may create fundamental concepts by leveraging predefined concepts and part-of-speech tags. The processor may also extract basic spans of the SPO structure based on the fundamental concepts. Further, where beneficial to the IE model, the processor may add surrounding context words. Finally, the processor may test the IE model to ensure the output is useful for downstream tasks. The IE model may be created to leverage predefined entity types, part-of-speech tags, other elements of the syntax such as the _w modifier that matches any token, and special tags for number (:NUM) and punctuation (:PUNC). Creation of a rule-based IE model is discussed in more detail in FIGS. 16-18.

To create a machine learning IE model (whether statistical machine learning model or deep learning model), the types of information that may need to be extracted may be identified. For example, in some embodiments, information such as names, dates, prices, or specific field values in documents may be extracted. Responsive to defining the target information to be extracted, in some embodiments, a dataset having a plurality of documents may be prepared where examples of the information to be extracted are labeled. In some embodiments, the labeling may include manually annotating the plurality of documents with the information to be extracted. In some embodiments, tools like spaCy, Label Studio, weak supervision techniques, such as rules, heuristics, or existing model outputs, etc. may be used to generate labels more quickly. After the dataset is labeled, a machine learning model may be selected based on the type and format of the input data. In some embodiments, machine leaning models like BERT or ROBERTa may be used. In other embodiments, other suitable machine learning models may be used and fine-tuned for sequence labeling (e.g., using BIO tagging). The plurality of documents may then tokenized and formatted for model training. In some embodiments, a pre-trained model may be fine-tuned on the labeled dataset, enabling the machine learning model to learn patterns associated with the key information. Once the machine learning model is trained, the machine learning model may be evaluated using metrics such as precision, recall, F1 score, etc. to measure how accurately the machine learning model extracts the desired information. In some embodiments, post-processing operations may be applied to clean up and standardize the output. In some embodiments, a semi-supervised approach may be used to train a machine learning IE model. More details of training a machine learning model are described in FIG. 11.

At operation 1515, the processor executes the at least one IE model created at the operation 1510 to extract a plurality of text segments from the set of documents. Execution of the at least one IE model is discussed in greater detail in FIG. 19. In some embodiments, each text segment that is extracted may be a snippet. A snippet may be a brief portion of text extracted from a document. For example, in some embodiments, a snippet may be less than one sentence long. In some embodiments, a snippet may be greater than one word (e.g., a couple of words up to a phrase or clause in length). Thus, in some embodiments, a snippet may be greater than one word and less than one sentence. In some embodiments, a snippet may be a few sentences or a paragraph. A snippet may be different from a summary. For example, in some embodiments, a summary may be longer than a snippet. A summary may provide a more comprehensive overview of the main points or themes or key details of the entire document, while a snippet may provide a brief excerpt of or highlight from the document. A summary may provide an understanding of the entire text of a document without having to read the entire text, while a snippet may provide a headline or teaser of the context. In other words, a summary may use words different from those used in the document to provide a concise summation of the document. In contrast, a snippet may extract verbatim a portion of text from the document. For example, a summary of an article may include the primary focus of the article, important arguments, findings, conclusion of the article, and any essential facts, data, or examples to support the arguments and findings, etc. A snippet of the same article may include the headline of the article and/or a sentence or two (or perhaps a paragraph) from the article to give a quick idea of what the article is about. Thus, the length, content, and purpose of a summary may be different from the length, content, and purpose of a snippet.

Each snippet (e.g., text segment) may include a chunk of text extracted by the IE model from the set of documents. In some embodiments, each snippet may include a plurality of key words from the set of documents. In some embodiments, each snippet may include a plurality of key phrases from the set of documents. In some embodiments, each snippet may include a combination of key words and key phrases from the set of documents. Further, in some embodiments, each snippet of the plurality of snippets may further include context text around at least one of one or more of the key words or one or more of the key phrases. Context text (also referred to herein as simply context) may be text surrounding a key word or key phrase where the surrounding text is related to the key word or key phrase by semantic role, domain relevance, or position in a document. Semantic role may refer to the underlying relationship that a word or phrase has with the main verb in a sentence, indicating the role the main verb plays in the described event or action (e.g., agent (the doer of an action), patient (the receiver of an action), instrument, location, or experiencer, etc.). In some embodiments, context text may involve determining a predetermined number of tokens on either side of a key word or phrase, defining one or more rules that identify potential useful neighboring concepts (e.g., allowing for inclusion of a neighboring verb and intervening text that is within x tokens from the key word or phrase), or looking for boundaries defined by the structure of the language (e.g., sentences, clauses, phrases, etc.). In other embodiments, the processor may identify context in other ways.

Each snippet (e.g., text segment) may, therefore, include one or more of a plurality of key words from the set of documents, a plurality of key phrases from the set of documents, context text related to the plurality of key words or the plurality of key phrases by semantic role, domain relevance, or position in the set of documents, or a combination of key words and key phrases from the set of documents, or the context text.

In some embodiments, the IE model may be created to generate a number of text segments from each document of the set of documents. In some embodiments, a text segment may be associated with multiple documents. For example, in some embodiments, if the topic relates to computer technology and multiple documents discuss differences between on-premise computing and virtual computing, a text segment relating to differences between on-premise and virtual computing may be relevant to multiple documents. In some embodiments, the IE model may be configured to identify synonyms and associate text segments when synonyms are used. For example, if document 1 uses terminology related to virtual computing but document 2 uses terminology related to cloud computing, the IE model may determine that virtual computing and cloud computing are generally synonymous. Thus, the processor may indicate that a text segment related to differences between cloud computing and on-premise computing is also associated with document 1, while a text segment related to differences between virtual computing and on-premise computing is also associated with document 2. Thus, the processor may identify one or more text segments from each document in the set of documents. Therefore, the text segments are a more accurate representation of the domain-aware, more important, and/or relevant key words or key information in the set of documents.

Further, the extracted text segments may reduce a number of tokens from a total number of tokens in each document of the set of documents to a first token count. Each document of the set of documents that is input into the IE model may include a plurality of tokens. In some embodiments, the IE model may be configured to accept a maximum number of tokens in each document. If a document has more tokens than the maximum number of documents, in some embodiments, that document may be split up into multiple documents, with each document having no more than the maximum number of tokens. Thus, the total number of tokens in each document of the set of documents may not be more than the maximum number of tokens allowed. Like the input to the IE model, the output (e.g., the plurality of text segments) from the IE model may include tokens. Because each text segment of the first plurality of text segments includes only a small portion of the underlying document, each text segment has fewer tokens than the underlying document from which that text segment is generated. Therefore, the total number of tokens, or the first token count, in the plurality of text segments is less than the total number of tokens across the set of documents. In other words, the sum of tokens in each text segment of the plurality of text segments is less than the sum of tokens in each document of the set of documents.

In some embodiments, for each text segment of the plurality of text segments, the processor may identify which documents from the set of documents the text segment belongs to. The processor may store the text segment together with the identified documents in a database. For example, in some embodiments, the processor may create a data structure such as a table (e.g., a look-up table) that stores the text segment and all the identified documents for that text segment. In other embodiments, the processor may use other or additional data structures. In some embodiments, the database may be a vector database. For example, in some embodiments, the database may be stored on a Retrieval-Augmented Generation (RAG) server. In other embodiments, the database may be stored on other types of storage medium.

Further, in some embodiments, multiple text segments may be extracted from each document of the set of documents to extract the plurality of text segments. In other embodiments, a single text segment may be extracted from each document of the set of documents to extract the plurality of text segments.

At operation 1520, the processor inputs at least a subset of the plurality of text segments extracted at the operation 1515 into an unsupervised machine learning model. In some embodiments, an unsupervised machine learning model may be a type of machine learning model that is configured to analyze and find patterns or trends in data without predefined labels or categories. In some embodiments, the unsupervised machine learning model may be a topic model. A topic model may be configured to perform topic modeling. Topic modeling may be configured to discover topics in the set of documents. Topic modeling may be considered a Natural Language Processing (NLP) task. In some embodiments, the topic model may implement a Latent Dirichlet Allocation (LDA) clustering model or a Singular Value Decomposition (SVD) model. Details on the implementation of LDA may be found in Blei, Ng, Jordan "Latent Dirichlet Allocation" (2003), the entirety of which is incorporated by reference herein. Details on the implementation of SVD may be found in Deerwester, Dumais, et al. "Indexing by Latent Semantic Analysis" (1990), the entirety of which is incorporated by reference herein. In other embodiments, other suitable topic models or any other suitable unsupervised machine learning model may be used to generate topics therefrom. In some embodiments, topic modeling may work by discovering words in each document of the set of documents and grouping or clustering related or similar words together into topics. A topic may, thus, be defined as a group of reoccurring related or similar words that appear in the set of documents and that represent a common theme or subject. The set of documents may generate one or more topics.

In some embodiments, all of the plurality of text segments may be input into the unsupervised machine learning model. In some embodiments, a subset of the plurality of text segments may be selected to be input into the unsupervised machine learning model. In some embodiments, to select a subset of the plurality of text segments, the processor may rank the plurality of text segments based on a frequency of occurrence of each text segment of the plurality of text segments in the set of documents. In some embodiments, the higher the frequency of occurrence, the higher the rank of the text segment. The processor may then select a predetermined number of highest ranked text segments to obtain a subset of text segments and input the subset of text segments into the unsupervised machine learning model. In some embodiments, to select a subset of the plurality of text segments, the processor may compute a term-frequency inverse document frequency (TF-IDF) score for each of the plurality of text segments. The processor may select a predetermined number of the plurality of text segments whose TF-IDF score is greater than a predetermined threshold to obtain a subset of text segments and input the subset of text segments into the unsupervised machine learning model. In some embodiments, the processor may compute the TF-IDF score as follows:

$$TF-IDF(t, d, D) = TF(t, d) * IDF(t, D) \qquad \text{Equation 1}$$

In equation 1 above, t is a term (e.g., phrase or word), d is a document, D is the set of all documents in a corpus, TF–IDF is the term-frequency inverse document frequency score of term t in document d, TF (t, d) is the term frequency that measures how frequently a term t appears in a document d, and IDF (t, D) is the inverse document frequency that measures how unique or rare a term t is across the set of documents, D. In some embodiments, the processor may compute TF (t, d) as follows:

$$tf(t, d) = \frac{f_{(t,d)}}{\sum_{t' \in d} f_{t',d}} \qquad \text{Equation 2}$$

In Equation 2 above, $f_{t,d}$ is the number of times a term t occurs in a document d and the denominator in Equation 2 is the total number of terms t in a document d (counting each occurrence of the same term separately). The processor may compute the IDF (t, D) as follows:

$$IDF(t, D) = \log\frac{N}{|\{d: d \in D \text{ and } t \in d\}|} \qquad \text{Equation 3}$$

In Equation 3 above, N is the total number of documents in the corpus, N=|D|.

At operation 1530, the processor executes the unsupervised machine learning model to output at least one topic for the set of the documents. In some embodiments, the number of topics that are generated from the unsupervised machine learning model may be specified as a user input into the unsupervised machine learning model. In some embodiments, the machine learning model may be configured to generate a minimum or maximum number of topics by default. In such instances, the unsupervised machine learning model may generate the default number of topics unless specified otherwise by the user. In some embodiments, each topic of the plurality of topics may belong to one or more documents of the set of documents. In other words, each document of the set of documents may be associated with one or more topics of the plurality of topics. For example, if 3 topics are generated from 1000 documents, topic 1 may be associated with 5 documents (e.g., 5 documents include text related to topic 1), topic 2 may be associated with all 1000 documents (e.g., all 1000 documents include text related to topic 2), and topic 3 may be associated with 500 documents (e.g., 500 documents include text related to topic 3). In some embodiments, each generated topic may include additional information associated therewith. For example, in some embodiments, each topic may identify the documents from the set of documents to which the topic belongs. For example, if a topic is only found in documents 1, 10, and 20, the topic may include an indication that the topic is found in documents 1, 10, and 20. This way, the documents to which each topic belongs may be easily identified. It is to be understood that any examples used herein are used for explanation purposes only and are not intended to limit the scope of the disclosure in any way. Thus, from the set of documents, at least one topic may be generated. In some embodiments, each of the at least one topic may be domain-aware.

Each topic of the plurality of topics may include a plurality of topic terms. Topic terms are words that are representative of a particular topic. For example, for a topic related to computer technology, topic terms may be words associated with computer technology (e.g., memory, binary, bits, bytes, central processing unit, operating system, etc.). In some embodiments, the topic terms may include a predetermined number of most significant words associated with a topic. In some embodiments, the number of topic terms to generate for each topic from the unsupervised machine learning model may be provided by the user as an input. In some embodiments, the number of topic terms to generate for each topic may be preprogrammed into the unsupervised machine learning model. In some embodiments, anywhere from 10 to 300 words may be generated for each topic. Further, in some embodiments, each topic in the plurality of topics may have the same number of topic terms. In other embodiments, one or more topics of the plurality of topics may have different number of topic terms.

Further, in some embodiments, each of the plurality of topic terms may be associated with a weight value. The weight value may be indicative of a relevance of a topic term to the topic. In some embodiments, relevance may be indicated by a frequency of occurrence of a topic term in the text associated with the topic. A topic term that occurs more frequently may be accorded a higher weight value. In some embodiments, relevance may be indicated by how closely connected or related to a topic a topic term is. For example, for a computer technology topic, terms such as "computer," "operating system," etc. may be accorded a higher weight value than terms like "wherein," "machine," etc. In some embodiments, the higher the weight value, the higher the relevance of the topic term to the topic. In some embodiments, the weight value may be a number between a predefined range (e.g., between 0 and 1). For example, a topic that may be generated from the unsupervised machine learning model may be as follows:

Topic 1: [('wherein', 0.035438593), ('second', 0.017641282), ('first', 0.015290709), ('surface', 0.015077849), ('mirror', 0.014189651), ('charging', 0.014186617), ('vehicle', 0.014154276), ('portion', 0.0133547215), ('assembly', 0.01099547), ('part', 0.010697912), ('configured', 0.010467553), ('comprises', 0.010351748), ('least', 0.009702432), ('front', 0.009596409), ('element', 0.009579583), ('electric', 0.008690997), ('one', 0.008391646), ('connected', 0.008011769), ('glass', 0.007848864), ('airbag', 0.007674934), ('guide', 0.0075757666), ('according', 0.0073977057), ('upper', 0.0071686436), ('end', 0.0070889005), ('cover', 0.0070684035), ('rear', 0.006724241), ('comprising', 0.006545309), ('lower', 0.006178395), ('position', 0.006003768), ('interior', 0.005641327), ('system', 0.005517785), ('drive', 0.005471626), ('anchor', 0.0050566075), ('method', 0.004883391), ('coupled', 0.0048464118), ('housing', 0.0047474275), ('connector', 0.0046585733), ('head', 0.004484321), ('wheel', 0.0044364403), ('seat', 0.004397048), ('plurality', 0.004354386), ('electrically', 0.0042882888), ('vehicular', 0.004115196), ('direction', 0.0039428654), ('provided', 0.0039153094), ('plate', 0.0038642006), ('module', 0.003801667), ('detent', 0.0037999535), ('link', 0.003749748), ('rearview', 0.0037298477), ('base', 0.003690733), ('coupling', 0.0036362086), ('third', 0.0034801231), ('substrate', 0.003436294), ('group', 0.0033716357), ('disposed', 0.0033322084), ('exterior', 0.0032236509), ('aircraft', 0.0031926788), ('side', 0.0031827462), ('fastening', 0.003149399), ('relative', 0.0030285025), ('light', 0.0029845354), ('formed', 0.0029823412), ('angle', 0.0029793773), ('connection', 0.002833421), ('motor', 0.0027290701), ('driver', 0.0027190323), ('unit', 0.0026712024), ('device', 0.0026593204), ('container', 0.002633983), ('fastener', 0.002627163), ('hook', 0.0026098767), ('optical', 0.002597458), ('linkage', 0.0025961779), ('gear', 0.0024662695), ('respective', 0.0024055734), ('force', 0.0023930436), ('reflective', 0.002385694), ('conductive', 0.0023607211), ('clip', 0.0023038886)]

Topic 1 above includes a plurality of topic terms (e.g., wherein, second, first, surface, mirror, etc.) and each topic term is followed by a number indicative of that topic term's weight value. The number of topic terms shown in Topic 1 above are only an example. The number of topic terms that are output may vary. In some embodiments, the topic terms in a topic may be arranged in an order from the highest weight value to the lowest weight value. In some embodiments, the unsupervised machine learning model may generate a first number (e.g., 100) of topic terms for a topic but output a second number (e.g., 20) of highest weighted topic terms. Thus, the topic term having the highest weight may be listed first and the topic term having the lowest weight may be listed last. In some embodiments, the topic terms may be arranged in the topic in another order. In some embodiments, a threshold value of the weight value may be defined. Potential topic terms whose weight value is below the defined threshold value may be discarded and not output as the plurality of topic terms. Thus, in some embodiments, only those potential topic terms whose weight value is above the defined threshold value may be output as the plurality of topic terms.

Further, in some embodiments, a topic term may occur in multiple topics. In other embodiments, a topic term may occur in a single topic. When a topic term occurs in multiple topics, in some embodiments, the weight value assigned to the topic term in each topic may vary depending upon the relevance of that topic term to that topic. Thus, the unsupervised machine learning model generates at least one topic for the set of documents, with each of the at least one topic having a plurality of topic terms, and each of the plurality of topic terms being associated with a weight value indicative of the relevance of a topic term to a topic.

The generated at least one topic may be used for a variety of purposes. For example, in some embodiments, the generated at least one topic may be used to generate a compressed prompt representing the set of documents to include in a compressed prompt. The compressed prompt may be input into a language model (e.g., a large language model) that is executed to generate a summary of the set of documents. In some embodiments, the at least one topic may be used to generate sentiment for the set of documents. In some embodiments, the at least one topic may be used to generate a topic label and topic description. In other embodiments, the at least one topic may be used for other or additional purposes.

In some embodiments, to generate the compressed prompt, the processor may concatenate the plurality of topic terms in a topic to generate a string for each topic. In some embodiments, the plurality of topic terms may be concatenated in a specific order. For example, in some embodiments, the plurality of topic terms may be concatenated in an order from a highest weight value to a lowest weight value. In some embodiments, the plurality of topic terms may be concatenated in an order from a lowest weight value to a highest weight value. In other embodiments, the plurality of topic terms may be concatenated in a random order, alphabetical order, or in any other desired order. The concatenated string provides a compressed representation of the set of documents.

Further, the prompt that is generated based on the compressed representation of the set of documents may include the concatenated string for a topic, an output definition defining a format for the output, and one or more constraints. The constraints may include a system role and a user role to provide a framework for how to generate the output. In some embodiments, the constraints may also include a summary of what to include in the output. Additional details of compressing the set of documents may be found in U.S. application Ser. No. 19/027,199, filed on Jan. 17, 2025, the entirety of which is incorporated by reference herein and U.S. application Ser. No. 19/202,283 filed May 8, 2025, the entirety of which is also incorporated by reference herein.

Figure 16:
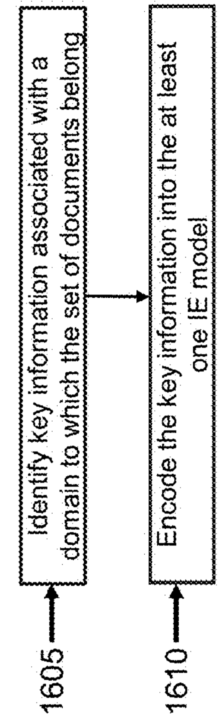
FIG. 16 illustrates a flowchart outlining example operations for creating an Information Extraction (IE) model for use in the process of FIG. 15, according to embodiments of the present technology.

Turning now to FIG. 16, an example flowchart outlining operations of a process 1600 is shown, in accordance with some embodiments of the present disclosure. The process 1600 may be executed by one or more processors (e.g., the processor 1430) executing computer-readable instructions (e.g., the topic generation computer-readable instructions 1445) associated with the topic generation application 1435. The process 1600 may be used for creating the IE model at the operation 1510. In particular, the process 1600 may be used for creating a rule-based IE model. The process 1600 may include other or additional operations in other embodiments.

To create the IE model, at operation 1605, the processor identifies key information associated with a domain to which the set of documents of the operation 1505 belongs. "Key information" may be information that is relevant to, or important for, the domain associated with the set of documents. In some embodiments, key information may include keywords, phrases, context, synonyms of keywords, key phrases, and context, lists of information, information of entity types, and any other information that may be considered related to or appropriate to the domain to which the set of documents belong. In some embodiments, the key information may additionally or alternatively include information that a user is interested in generating a topic for. For example, if a user is interested in generating topics related to car manufacturing processes, the key information to be extracted from the set of documents may include keywords, key phrases, lists of information, and/or context text associated with manufacturing processes in cars. In some embodiments, the key information may be user defined and input into the IE model being created. In some embodiments, the user may input the domain information and the IE model being created may automatically determine the key information and generate keywords, key phrases, lists of information, and/or context text for which to generate the rules. Identification of the key information is discussed in more detail in FIGS. 17 and 18.

At operation 1610, the processor encodes the key information from the operation 1605 into the at least one IE model being created at the operation 1510. In some embodiments, encoding the key information may include the process of converting the key information into a representation that is suitable for the IE model to analyze and model. In some embodiments, "encoding" may take the form of rules in a rule-based model, labeled data used to train a machine learning or deep learning model, or a hybrid of the two.

Figure 17:
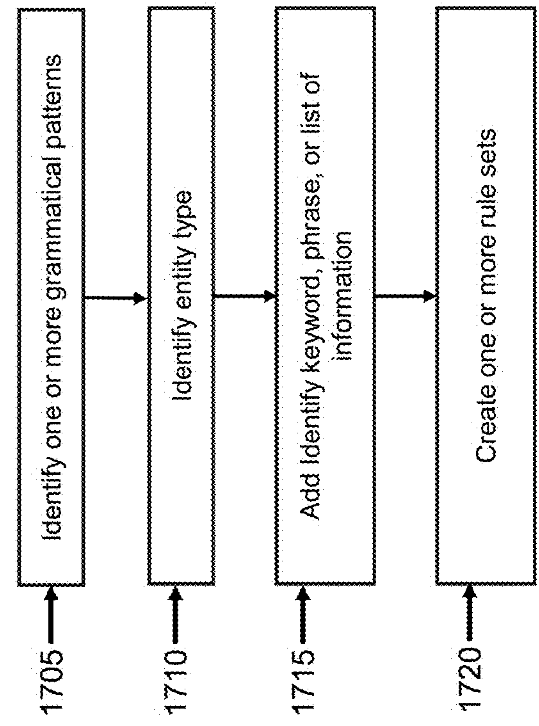
FIG. 17 illustrates a flowchart outlining example operations for identifying key information from the set of documents of FIG. 15 for creating the IE model of FIG. 16, according to embodiments of the present technology.

Turning now to FIG. 17, an example flowchart outlining operations of a process 1700 is shown, in accordance with some embodiments of the present disclosure. The process 1700 may be executed by one or more processors (e.g., the processor 1430) executing computer-readable instructions (e.g., the topic generation computer-readable instructions 1445) associated with the topic generation application 1435. The process 1700 may be used to identify key information associated with a domain to which the set of documents of the operation 1505 belongs. Thus, the process 1700 describes the operation 1605 in greater detail. The process 1700 may include other or additional operations in other embodiments.

At operation 1705, the processor identifies one or more grammatical patterns from the set of documents received at the operation 1505. In some embodiments, the key information in a document may be found in named entities, noun phrases, and verb phrases—as these elements may carry important information. Thus, to identify the key information, in some embodiments, the processor may identify one or more grammatical patterns from the set of documents. In some embodiments, the one or more grammatical patterns may include nouns and noun modifiers (e.g., text segments that include nouns and/or noun modifiers), verbs (e.g., text segments that include verbs), or adjectival phrases (e.g., text segments that include adjectives). A noun modifier may include adjunct or attributive nouns that modify other nouns by describing or restricting the nouns. The noun modifiers may be used to make written and spoken language more descriptive and precise. The one or more grammatical patterns may include other parts of speech. FIG. 18 describes the process for identifying the one or more grammatical patterns in more detail.

By identifying the one or more grammatical patterns, the processor may identify, at operation 1710, an entity type from the set of documents received at the operation 1505. In some embodiments, the entity type may be a predefined entity type based on the domain of the set of documents. In some embodiments, the domain of the set of documents may be determined or defined by the user and input into the IE model. In other embodiments the domain of the set of documents may be identified through exploratory activities such as topic identification, parsing, statistical profiles of the corpus, etc. These activities may uncover patterns in the documents that help to determine the composition of the set of documents. In some embodiments, examples of entity types may include name, location, date, address, currency, measurement, temperature, and other relevant information for a particular domain. Based on the domain, the entity type may vary. For example, for an automobile domain, the entity type may include type of automobile (e.g., car, truck, boat, etc.), vehicle number (e.g., number plate), model of the vehicle, color of the vehicle, manufacturing location, assembly location, etc. In some embodiments, the identified entity type may be used to create one or more entity type rules (e.g., myEntity rule). The one or more entity type rules may be used to extract text segments from the set of documents that are relevant to the predefined entity types.

In some embodiments, the one or more grammatical patterns may similarly be used to identify, at operation 1715, one or more of a keyword, phrase, or list of information from the set of documents received at the operation 1505. In some embodiments, the keyword, the phrase, or the list of information may be predetermined or predefined by the user, and/or may be associated with the domain to which the set of documents belongs. Similar to the entity type, the processor may create one or more rules for each of the keywords, phrases, or lists of information.

At operation 1720, the processor creates one or more rule sets based on the one or more grammatical patterns, the entity type, and the one or more of the keyword, phrase, or list of information of the operations 1705-1715. In some embodiments, each rule may include a predefined rule syntax having a rule name between a rule type and a rule definition. In some embodiments, the processor may create the one or more rule sets by defining one or more rules for extracting text segments (e.g., first text segments) associated with the one or more grammatical patterns, the entity type, and the one or more of the keyword, phrase, or list of information. In some embodiments, the processor may add context around the text segments to obtain the one or more rule sets.

In particular, the processor may extract one or more text segments from the set of documents received at the operation 1505 based on the one or more grammatical patterns, the entity type, and the one or more of the keyword, phrase, or list of information. In some embodiments, the processor may leverage the Subject-Predicate-Object (SPO) structure or grammatical framework that forms the basis of sentence construction to extract the text segments. The SPO structure includes three main components: (1) subject—the person, thing, or entity that performs an action or is described in a sentence; (2) predicate—the verb or action that the subject performs; and (3) object—the thing, entity, or person that is impacted by the action of the subject. For example, in a sentence "the dog chased the ball," the subject may be the dog, the predicate may be the word chased, and the object may be the ball. The SPO structure may be used to analyze sentence meaning and extract information from text. In particular, the SPO structure may be used to extract the key information from the set of documents received at the operation 1605.

For example, in some embodiments, the processor may be used to break down sentences in a document into SPO components (also referred to herein as SPO structures). The processor may extract the SPO structures from the set of documents leveraging the grammatical concepts identified at the operation 1705. In some embodiments, before SPO extraction, the processor may use the one or more grammatical patterns to identify the entity types, the keywords, key phrases, and/or the lists of information. In some embodiments, the processor may additionally or alternatively implement a Named Entity Recognition (NER) process to identify the entity types, the keywords, key phrases, and/or the lists of information. In some embodiments, the processor may use other or additional mechanisms to identify the entity types, the keywords, key phrases, and/or the lists of information.

Responsive to determining the entity types, the keywords, key phrases, and/or the lists of information, the processor may analyze sentence structure and/or clause structure, for example, by using dependency parsing, to map grammatical relationships. For example, the processor may determine how the identified entity types, the keywords, key phrases, and/or the lists of information relate to each other in a sentence. In other words, the processor may determine and extract the subject, predicate, and object associated with the identified entity types, the keywords, key phrases, and/or the lists of information. In some embodiments, the extracted information may be in an SPO format that is suitable for the IE model to understand. Additional details for identifying the SPO structures in a text may be found in Banko, Cafarella, Soderland, Broadhead, Etzioni "Open Information Extraction from the Web" (*Commun. ACM* 2008, 51, 68-74), the entirety of which is incorporated by reference herein.

In some embodiments, a document may not have all three components of the SPO structure. In some embodiments, there may be variations to the SPO structure. For example, in some embodiments, certain verb types may not take objects, may have passive verb constructions, imperatives, etc. These variations may only contain two elements: Subject-Predicate (SP) or Predicate-Object (PO). An SP structure may be present when the object may be omitted or not required for a specific verb. For example, in the sentence "Mary runs", there is a subject (Mary) and a predicate (runs), but no explicit object. A PO structure may be present when, in imperative sentences or certain syntactic constructions, the subject is omitted. For example, in the sentence "eat the cake," there is a predicate (cat) and an object (cake) but no subject. Such PO and SP structures may also be included in extracting the text segments from the set of documents. Thus, in some embodiments, the processor may extract SPO, SP, and PO structures from the set of documents based on the one or more grammatical patterns, the entity type, and the one or more of the keyword, phrase, or list of information. In some embodiments, nouns may be associated with the S (subject) and O (object) part of the SPO structure and verbs may be associated with the P (predicate) part of the SPO structure.

In some embodiments, the main elements of the SPO structure may be a myNoun rule and a myVerb rule. In particular, in some embodiments, a myEntity concept may be used in the model to collect entity types (e.g., person, place, organization, etc.). The myEntity concept may then be used by reference in a rule in the myNoun concept. The myNoun ceoncept may be considered a component of the SPO structure at the top level of the rule dependency hierarchy. In some embodiments, the myNoun concept (rule set) may incorporate all the rules from the myEntity concept (rule set) by referencing the myEntity concept. In addition to the rule that references myEntity, the myNoun concept (rule set) may also include rules that reference broader grammatical categories (e.g., specific POS labels) such as common nouns (:N), proper nouns (:PN), and noun phrases (nlpNounGroup).

In some embodiments, the my Verb rule captures all verbs or verb categories using a POS tag ":V" (and/or :V1sg tag, :V3sg tag, Ving tag, :Vpp tag :Vpt tag). The POS tag :V may be used to indicate undeclined be, do, or have auxiliary/undeclined verb/first person singular verb such as be, do, have, go, see, love, am, etc. The POS tag :V3sg may indicate third person singular be, do, or have auxiliary/third person singular verb such as is, does, has, goes, sees, loves, etc. The POS tag :V1sg includes first person singular verb such as am, do, have, go, see, love, etc. The POS tag :Ving may include present participle be, do, or have auxiliary/present participle such as being, doing, having, bucketing, climbing, etc. The POS tag :Vpp past participle be, do, or have auxiliary/past participle such as been, done, had, dashed, factored, gone, etc. The POS tag :Vpt may include past tense be, do, or have auxiliary/past tense verb such as was, were, did, have, dashed, factored, went. In some embodiments, the my Verb rule may include tokens tagged with verb-related parts of speech (:V), capturing the predicate component of the SPO structure.

In other embodiments, the main elements of the SPO structure may include other or additional rules to capture other or additional POS. In some embodiments, each rule in the myEntity rule may include a predefined rule syntax. The predefined rule syntax may include a rule name between a rule type and a rule definition. Examples of the myEntity concept to leverage predefined entity types may be defined as:

Rule Type 1: myEntity: nlpPerson

Rule Type 2: myEntity: nlpPlace

Rule Type 3: myEntity: nlpOrganization

In the examples above, nlpPerson corresponds to the predefined entity type "person name" from text based upon lists, token characteristics, and/or the relationship between elements in a sentence, nlpPlace corresponds to the predefined entity type "place," and nlpOrganization corresponds to the predefined entity type "organization." The prefix "nlp" may be used to indicate and differentiate rules from other constructs. Thus, the myEntity rule is defined to extract text segments from the set of documents that relate to "person," "place," and "organization" concepts. In particular, the myEntity label may refer to a concept name in the model (a concept is a set of rules). This concept may group together all of the entity models by reference, acting as a new label for the set of entities that can then be used by reference in other rules. In the examples above, nlpPerson, nlpPlace, and nlpOrganization are rule definition, while myEntity is the concept name.

An example of the my Verb concept above may be defined as:

Rule: my Verb::V

The my Verb label may be the concept that the rule is a part of. :V is the rule definition that looks for a POS tag :V.

Examples rules for the myNoun concept may be defined as:

Rule: myNoun::N

Rule: myNoun::PN

Rule: myNoun: nlpNounGroup

Rule: myNoun: myEntity

The myNoun label is the concept (set of rules) that these rules are a part of. Each of these rules may be defined by a POS tag such as :N, :PN, etc. The nlpNounGroup rule is also a part of the concept myNoun, referencing a previously defined model called nlpNounGroup that finds modified nouns and groups the modifiers and the head noun together. All the rules of nlpNounGroup may be incorporated by the reference in the definition part of this rule. The myEntity rule may be a grouping of references to different models. Then this grouping may be referenced here to incorporate all the selected entity models into the myNoun concept definition/rule set. Similar rules may be created for specific keywords, key phrases, or lists of information.

In some embodiments, responsive to extracting the text segments, the processor may add context around the extracted text segments. In some embodiments, the extracted text segments may not capture structures that contain negation, adverbs, adjectives, etc. Therefore, in some embodiments, context may be added to allow one to three arbitrary words to be inserted between elements of the SPO/SP/PO structure. In some embodiments, to add context around the text segments, the processor may identify a predetermined number of tokens surrounding the SPO/PO/SP structure. In some embodiments, the processor may remove numbers and punctuation from the predetermined number of tokens to obtain a subset of tokens. The processor may then combine the subset of tokens with the SPO/PO/SP structure to add the context. For example, the processor may create the following rules to add context:

#Any Word concept leveraging _w to identify any tokens surrounding an extracted text segment, where _w is a modifier for any token in a text CONCEPT: AnyWord: _w

#Exclude punctuations and numbers from AnyWord

REMOVE_ITEM: Any Word: (ALIGNED, "_c {AnyWord}", ": PUNC")

REMOVE_ITEM: Any Word: (ALIGNED, "_c {AnyWord}", ": NUM")

The REMOVE_ITEM is a rule type that removes a set of items from a set of existing matches. For example, the REMOVE_ITEM may remove items from the Any Word concept that also fit the POS tag of punctuation or numerical token.

#ContextSpan leveraging AnyWord is a concept for referencing AnyWord to incorporate all matches for AnyWord (with the punctuation and numerical tokens removed) by reference. The rules in this set indicate that matches of 1-3 words from AnyWord in sequence define a context span. In particular, the ContextSpan rule may be used to include surrounding context words as needed to support the SPO structure. In some embodiments, a standalone SPO structure may not capture important modifiers such as negations, adverbs, or adjectives. Therefore, in some embodiments, one to three arbitrary words to be inserted between elements of the SPO structure to preserve meaning. Examples of ContextSpan rules may include:

CONCEPT: ContextSpan: Any Word

CONCEPT: ContextSpan: Any Word Any Word

CONCEPT: ContextSpan: Any Word Any Word AnyWord

#SPO concept leveraging myVerb and myNoun concepts. This set of rules uses only my Verb and myNoun concept references to define the rules. This means that the verb matches and noun matches may be adjacent to one another in the text to match the concept. Examples of the CONCEPT rules include:

CONCEPT: SPO: myNoun my Verb myNoun

CONCEPT: SPO: myNoun myVerb

CONCEPT: SPO: myVerb myNoun

#Insert ContextSpan between elements of the SPO structure to model context. This set of rules is also part of the definition of the SPO concept, but represents use of the ContextSpan concept to allow for up to 3 words between elements of the noun and verb matches. Examples of the CONCEPT rules include:

CONCEPT: SPO: myNoun ContextSpan myVerb myNoun

CONCEPT: SPO: myNoun myVerb ContextSpan myNoun

CONCEPT: SPO: myNoun ContextSpan myVerb ContextSpan myNoun

CONCEPT: SPO: myNoun ContextSpan myVerb

In some embodiments, the processor may adjust the size of the extracted text segment to which context has been added based on different types of data, choosing either larger or smaller units. In some embodiments, due to non-standard text structures, there may be few text segments that fit a desired pattern. In particular, in some embodiments, due to non-standard text structures—such as those found in informal or highly abbreviated formats like tweets, chat messages, or social media posts—there may be fewer text segments that match a desired pattern. These desired patterns may refer to syntactically complete and semantically clear sentence structures (e.g., well-formed SPO relationships) that may be easier for an IE model to process. In contrast, non-standard texts may include fragments, slang, emojis, or inconsistent grammar, which makes it challenging to apply traditional extraction patterns. In such cases, the processor may simplify the expected patterns or apply loose matching criteria to extract useful information from these irregular sources, for example, by using simpler structures such as a single myNoun. In such cases, the processor may consider using structures like single myNoun, or a pattern like “ContextSpan myNoun ContextSpan” to extract nouns or noun phrases with or without their contextual information. In some embodiments, the processor may use different elements to anchor the extracted text segment to which context has been added. In other words, the processor may rely on various elements within the text to determine how the extracted segment may be positioned or centered. For example, anchors may include key nouns, verbs, or entity types, rather than a full SPO structure, to guide the inclusion of surrounding words. In addition, in some embodiments, other elements such as cue phrases, discourse markers, structural markers like section headers or bullet points may also serve as anchors. By supporting a diverse set of anchor types, the proposed approach flexibly adapts to a wide range of text formats and structures. In some embodiments, the processor may anchor the extracted text segment to which context has been added based on domain-specific elements. Such domain-specific elements may be modeled and used as a required starting point to generate a text segment.

To show the varying sizes of the extracted text segments, the following passages may be used as an example from Table 1:

TABLE 1

| |
|---|
| On Thursday, Nvidia launched a language learning platform using artificial intelligence that promises to do just that for American Sign Language learners, in partnership with the American Society for Deaf Children and creative agency Hello Monday. |
| The platform, called Signs, features a 3-D avatar to demonstrate signs. Users keep their video cameras on while interacting with the platform and an AI tool provides feedback as they practice the signs. At launch, the platform features 100 distinct signs, but Nvidia hopes to grow that to 1,000. |
| Signs represents just one of the many ways AI is helping to advance work on assistive technologies, or tools designed to help people who are disabled or elderly, or their caretakers. Meta, Google and OpenAI have, for example, used AI to improve features for blind or low-vision users, and Apple introduced AI-enabled eye tracking to help physically disabled users navigate their iPhones. Blind users say those advancements are already making it easier for them to navigate life and work. |
| SAS is committed to enhancing fan engagement at LAFC and BMO Stadium, using cutting-edge analytics and customer insights that will allow the club to make informed decisions and create more meaningful interactions with its most engaged fans. Harnessing the power of the SAS ® Viya ® data and AI platform, LAFC will gain real-time insights into everything from player performance to fan behavior, allowing the club to stay ahead of the competition and drive sustainable growth both on and off the field. With SAS Customer Intelligence 360, LAFC aims to revolutionize its marketing strategies and drive personalized experiences within its digital and in-stadium marketing. |
| “Our partnership with LAFC is about combining our strengths in data and AI with their passion for the game,” said Jenn Chase, SAS Chief Marketing Officer. “Imagine a match day where every fan feels uniquely connected to the action, where data-driven insights enhance everything from ticketing to in-stadium experiences. SAS will help LAFC make smarter decisions on fan engagement, creating unforgettable experiences and taking the excitement to unprecedented levels.” |

Applying the process 1700, the rules created using the process 1700 may extract the following text segments (with added context) from the above passages:

TABLE 2

| |
|---|
| Nvidia launched a language learning platform |
| artificial intelligence that promises to do just that for American Sign Language |
| called Signs |
| 3-D avatar to demonstrate signs |
| video cameras on while interacting with the platform |
| AI tool provides feedback as they practice the signs |
| Nvidia hopes to grow |
| Signs represents |
| AI is helping to advance work on assistive technologies |
| tools designed to help people who are disabled or elderly |
| Google and OpenAI have |
| AI to improve features |
| Apple introduced AI-enabled eye tracking to help physically disabled users navigate their iPhones |
| Blind users say those advancements are |
| navigate life and work |
| SAS is committed to enhancing fan engagement at LAFC |
| using cutting-edge analytics |
| customer insights that will allow the club |
| informed decisions and create more meaningful interactions |

TABLE 2-continued

| |
|---|
| Harnessing the power |
| LAFC will gain real-time insights |
| player performance to fan behavior |
| club to stay ahead of the competition |
| LAFC aims to revolutionize its marketing strategies |
| drive personalized experiences |
| LAFC is about combining our strengths in data |
| said Jenn Chase |
| Imagine a match day |
| fan feels uniquely connected to the action |
| data-driven insights enhance everything from ticketing to in-stadium experiences |
| SAS will help LAFC make smarter decisions on fan engagement |
| unforgettable experiences and taking the excitement to unprecedented levels |

As seen from Table 2, the extracted text segments to which context has been added may be of varying sizes.

Turning now to FIG. 18, an example flowchart outlining operations of a process 1800 is shown, in accordance with some embodiments of the present disclosure. The process 1800 may be executed by one or more processors (e.g., the processor 1430) executing computer-readable instructions (e.g., the topic generation computer-readable instructions 1445) associated with the topic generation application 1435. The process 1800 may be used to identify one or more grammatical patterns in the set of documents received at the operation 1505. Thus, the process 1800 describes the operation 1705 in greater detail. The process 1800 may include other or additional operations in other embodiments.

At operation 1805, the processor determines sentence boundaries in each document of the set of documents received at the operation 1505 to obtain a plurality of sentences. By recognizing the sentence boundaries, the processor may perform sentence segmentation and split each document of the set of documents into individual sentences. Each document of the set of documents may generate a plurality of sentences. In some embodiments, the processor may perform sentence segmentation by looking for specific punctuation marks, such as periods, questions marks, exclamation points, etc. to identify sentence endings. In some embodiments, certain punctuation marks (e.g., periods) may be used to signal an abbreviation instead of a sentence ending. In some embodiments, certain punctuation marks that are typically used to indicate sentence endings may be used mid-sentences (e.g., exclamation point used mid-sentence). The processor may, thus, handle such ambiguities, to determine actual sentence boundaries. In some embodiments, the processor may handle ambiguities to determine actual sentence endings by analyzing one or more words before and/or after ambiguous punctuation marks to understand the meaning of the ambiguous punctuation mark. In some embodiments, the processor may apply grammar rules, use real-world knowledge, or previous training to determine actual sentence endings. In some embodiments, the processor may use a rule-based or machine learning model to perform sentence segmentation. Additional details of sentence segmentation may be found in Kiss, Strunk, "Unsupervised Multilingual Sentence Boundary detection" (Computational Linguistics, Volume 32, Number 4, December 2006), the entirety of which is incorporated by reference herein.

At operation 1810, the processor determines word boundaries in each of the plurality of sentences to generate a plurality of tokens. In some embodiments, the processor may apply a tokenization process to each of the plurality of sentences generated at the operation 1805 to generate a plurality of tokens. In some embodiments, the processor may apply the tokenization process to determine the tokens and then identify sentences based on the tokens. Tokenization is the process of segmenting text into smaller units called tokens, corresponding to words, punctuation marks, and/or meaningful subunits. Each token may represent a single word or punctuation symbol, although in some cases, tokens may include multi-word expressions. In some embodiments, the processor may identify token boundaries by detecting whitespace and punctuation characters that separate words. In other embodiments, the processor may apply additional or alternative techniques, such as rule-based methods, machine learning models, or language-specific heuristics, to accurately segment sentences into tokens, particularly when handling contractions, abbreviations, or languages without explicit word boundaries. In some embodiments, tokenization may be performed by breaking down each sentence into the tokens. In other embodiments, the processor may apply other or additional mechanisms to generate the plurality of tokens. Additional details of tokenization maybe found in Sabrina J. Mielke, Zaid Alyafeai, Elizabeth Salesky, Colin Raffel, Manan Dey, Matthias Gallé, Arun Raja, Chenglei Si, Wilson Y. Lee, Benoît Sagot, Samson Tan, "Between words and characters: A Brief History of Open-Vocabulary Modeling and Tokenization in NLP" (Computing Research Repository, 2021), the entirety of which is incorporated by reference herein.

At operation 1815, the processor lemmatizes each of the plurality of tokens generated at the operation 1810. Lemmatization is a process of normalizing a word to its base or root form and determining a lemma therefrom, while keeping the meaning of the word intact. In some embodiments, inflectional lemmatization may be used. In some embodiments, other types of lemmatization such as derivational lemmatization (computer, computed, computes, computational) but also (play, plays, replay, outplay, player, airplay, byplay, playbook, playful, playoff, playboy), may be used. Lemmatization may help understand text better by grouping different variations of a word under a single, meaningful unit. Thus, lemmatization may recognize different forms (e.g., synonyms) of a word as the same concept. To lemmatize a token (e.g., in inflectional lemmatization), the processor may identify the token's POS. In some embodiments, the processor may identify the POS by analyzing a word's meaning (e.g., from a dictionary), checking for the word's position in a sentence, and/analyzing surrounding words. For example, the processor may determine whether the token is a noun, verb, adjective, adverb, etc. Additional details for analyzing POS of a token may be found in Jamilu Awwalu, Saleh El, Yakub Abdullahi, Abraham Eseoghene Evwiekpaefe, "Parts of Speech Tagging: A Review of Techniques" (FUDMA Journal of Sciences (FJS), Vol. 4 No. 2, June 2020, pp 712-721, June 2020), the entirety of which is incorporated by reference herein.

Responsive to determining the POS of a token, the processor may determine the root form of the token. In some embodiments, the processor may determine the root form from a dictionary accessible to the processor. In other embodiments, the processor may determine the root form in other ways. In some embodiments, the root form may be considered the most basic, irreducible part, without suffixes or prefixes, of a word. In some embodiments, the processor may then determine the lemma of the token based on the POS and the root form. For example, in some embodiments, the processor may determine the lemma from a dictionary that the processor may have access to. The processor may match the root form plus the POS from the dictionary to determine the lemma of the token. In other embodiments, the processor may use other or additional mechanisms to determine the lemma for each token of the plurality of tokens. Additional details of lemmatization may be found in Divya Khyani, Siddhartha B S, Niveditha N M, Divya B M, "An Interpretation of Lemmatization and Stemming in Natural Language Processing" (Journal of University of Shanghai for Science and Technology, January 2021), the entirety of which is incorporated by reference herein.

At operation 1820, the processor applies a POS label to each of the plurality of tokens. In some embodiments, the operation 1820 may be performed simultaneously with the operation 1815 when the POS is determined. In some embodiments, the POS label may be considered a tag assigned to a token to indicate the token's grammatical role in a sentence. The POS label may help with understanding a token's structure. In some embodiments, the POS labels may be NN or N for noun, V or VB for verb, JJ or ADJ for adjectives, RB for adverbs, PRP for pronouns, IN or PPOS for prepositions, CC for conjunctions, and UH for interjections. These POS tags are only an example and other notations may be used for these POS tags. In other embodiments, the POS label may include other or additional POS that may be labeled using the POS tags. Additional details of applying a POS label may be found in K Aparna, Pooja Bhakta, Suchetha Vijaykumar, "A Review on Different Approaches of POS Tagging in NLP" (SACAIM-2022, Chapter 9), the entirety of which is incorporated by reference herein.

At operation 1825, the processor determines the one or more grammatical patterns, word groupings or lists, and/or entities based on the part-of-speech labels of the operation 1820 and the lemmatized plurality of tokens of the operation 1815. In some embodiments, the processor may leverage token characteristics, grammatical role (part of speech label), and word relationships (with sentence, within N tokens, following a preposition, word ordering, etc.) to identify the one or more grammatical patterns. For example, to identify a noun, the processor may find a: N POS tag. To identify a noun group, the processor may look to the left of the noun to find additional modifiers such as nouns, adjectives, and/or other types of modifiers. In some embodiments, the processor may create a rule that groups related terms together in a match. In some embodiments, to identify a person's name, the processor may look for tokens that have an initial uppercase letter (token characteristic), and see if the token is in a names list. If a token is not in a names list, the processor may look for a cue such as a title (Mr., Ms., Dr., Honorable, Sergeant, etc.). If a title is found, the processor may consider the token as a potential first or last name. The processor may look to the right of a token to continue looking for capitalized words and check the names list. If the processor finds a title or a name on the names list in these words, the processor may determine that a person's name is found. In other embodiments, the processor may use other types of cues for other types of entities. In some embodiments, to identify a date, the processor may look for date formatting cues (token type) or look for key words such as month names, holiday names, etc.

Figure 19:
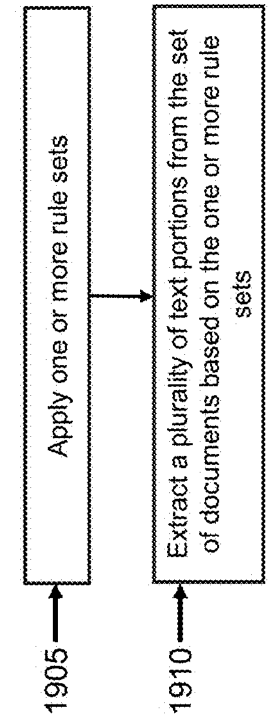
FIG. 19 illustrates a flowchart outlining example operations for extracting text segments using the created IE model of FIG. 16 for use in the process of FIG. 15, according to embodiments of the present technology.

Turning now to FIG. 19, an example flowchart outlining operations of a process 1900 is shown, in accordance with some embodiments of the present disclosure. The process 1900 may be executed by one or more processors (e.g., the processor 1430) executing computer-readable instructions (e.g., the topic generation computer-readable instructions 1445) associated with the topic generation application 1435. The process 1900 describes the operation 1515 in greater detail. The process 1900 may include other or additional operations in other embodiments.

At operation 1905, the processor applies one or more rule sets defined for at least one entity, word list, or grammatical pattern. In particular, the processor may receive as a user input one or more of an entity type, word list (e.g., keywords, key phrases, lists of information), and/or one or more grammatical pattern. The one or more of an entity type, word list (e.g., keywords, key phrases, lists of information), and/or one or more grammatical pattern may be indicative of the at least one topic that is desired to be generated. In some embodiments, the one or more of an entity type, word list (e.g., keywords, key phrases, lists of information), and/or one or more grammatical pattern for which the at least one topic is generated may be different than the one or more of an entity type, word list (e.g., keywords, key phrases, lists of information), and/or one or more grammatical pattern from which the one or more rule sets are created. In some embodiments, the processor may receive the user input via a user interface (e.g., a display of the output devices 1420). In other embodiments, the processor may receive the user input in other ways. In some embodiments, the processor may execute an IE model to apply the one or more rule sets. The IE model may include one or more rule sets that define the text to extract or be defined/constructed in other ways.

At operation 1810, the processor extracts a plurality of text portions from the set of documents based on the one or more rule sets (e.g., by executing the IE model) as the plurality of text segments. In some embodiments, the processor may apply the one or more rule sets (e.g., by executing the IE model) created using the processes 1600, 1700, and 1800 to the set of documents to extract a plurality of strings as the plurality of text portions. These extracted text portions may be reflective of the key information or relevant information in the set of documents. These extracted text portions may then be used to generate the at least one topic, as discussed above.

Thus, the proposed approach of generating the at least one topic determines the topics from all the words in a document collection and their relationships. The proposed approach creates an IE model specific to the input text (e.g., the set of documents) to extract key words or phrases (with or without additional context) creating text segments that are used as input to the topics model, thereby helping to generate more focused and interpretable topics. In some embodiments, the created IE model may be a specific model or a generic model that leverages grammatical patterns and relatively generic entities. In some embodiments, a specific model such as one for the medical domain may have different lists and potentially different grammatical patterns defined in the rules. Also, entity models in the medical domain may be specific to the domain and focus on elements like medicine names, measurements, chemical names, symptoms, etc. A generic model may be relevant across multiple domains.

Several experiments were conducted to compare the proposed approach with conventional approaches. The results of these experiments are described below. The first set of experiments visually compared the topic words generated by the base approach of using full documents to generate the topics relative to the proposed approach. The output from the base approach and from the proposed approach includes a plurality of topic terms and assigned weight values. For the proposed approach, the IE model was created by leveraging a noun group model provided in the SAS® Visual Text Analytics product provided by SAS Institute Inc. of Cary, North Carolina. Context was added based on important verbs in the input text. The created IE model was not a domain-specific model. The same input set of documents was used for both the proposed approach and the base approach.

The input set of documents includes Experiment 1 1105 patents from the B60 VEHICLES category, as retrieved from https://bulkdata.uspto.gov/data/patent/application/redbook/fulltext/2023/. The experiments used the claim text from each patent instead of the full documents to expedite the results for both the proposed approach and the base approach. Thus, for the base approach, the entire set of claims from each patent was used to generate topics. The results of generating the topics using the base approach resulted in topics like the following:

topic 1: [('said', 0.06408806), ('wherein', 0.03749957), ('charging', 0.024511088), ('electric', 0.020082306), ('least', 0.018290104), ('one', 0.01602102), ('mirror', 0.013398026), ('element', 0.011922647), ('second', 0.011859786), ('comprises', 0.010280395), ('first', 0.010137278), ('system', 0.009590098), ('vehicle', 0.008531267), ('surface', 0.008520701), ('front', 0.0073700207), ('comprising', 0.006949451), ('glass', 0.0068547064), ('configured', 0.0067666937), ('side', 0.006447161), ('drive', 0.006250148)]

topic 2: [('first', 0.02408636), ('wherein', 0.023743844), ('second', 0.020563904), ('portion', 0.018667001), ('air', 0.014394036), ('one', 0.014337179), ('direction', 0.01388562), ('tire', 0.013568628), ('surface', 0.012359628), ('side', 0.010953392), ('least', 0.010625414), ('heat', 0.009981986), ('valve', 0.009947447), ('end', 0.009326155), ('body', 0.0091343615), ('according', 0.009038914), ('fluid', 0.008576154), ('member', 0.008428708), ('outer', 0.008164801), ('inner', 0.0077689122)]

topic 3: [('portion', 0.029750824), ('first', 0.026429534), ('wherein', 0.024751024), ('second', 0.02319494), ('vehicle', 0.014510148), ('configured', 0.013207808), ('direction', 0.011441734), ('end', 0.011334882), ('gear', 0.011044519), ('light', 0.009876969), ('position', 0.009788029), ('member', 0.0097210705), ('surface', 0.009695806), ('cover', 0.009587929), ('side', 0.009137771), ('assembly', 0.009046631), ('according', 0.008291148), ('body', 0.007893937), ('airbag', 0.007225229), ('comprising', 0.006933309)]

Using the proposed approach in which the entire set of claims from each patent was input into an IE model to extract a plurality of text segments, which were then input into a topic model resulting in topics like the following:

topic 1: [('power', 0.041263178), ('control', 0.036681965), ('vehicle', 0.0354548), ('system', 0.025154823), ('configured', 0.020847155), ('method', 0.01815241), ('unit', 0.017476505), ('torque', 0.017162055), ('device', 0.017050546), ('apparatus', 0.01636811), ('wheel', 0.014801972), ('module', 0.013255929), ('braking', 0.013017365), ('value', 0.011874721), ('according', 0.0101763485), ('electric', 0.009284049), ('comprising', 0.009152061), ('predetermined', 0.008215527), ('determining', 0.008167952), ('speed', 0.007836626)]

topic 2: [('mirror', 0.032035705), ('assembly', 0.028144935), ('element', 0.022752054), ('layer', 0.02136626), ('according', 0.01900383), ('rearview', 0.017247567), ('light', 0.016552221), ('comprises', 0.015656574), ('surface', 0.013948206), ('interior', 0.013817281), ('tire', 0.0132057145), ('comprising', 0.013172129), ('component', 0.00964507), ('vehicular', 0.009603998), (portion), 0.009486904), ('rubber', 0.009194747), ('independent', 0.008997628), ('decorative', 0.008445053), ('optical', 0.007766174), ('device', 0.00680066)]

topic 3: [('vehicle', 0.042954348), ('data', 0.042880397), ('system', 0.033794444), ('method', 0.031216143), ('based', 0.027489584), ('sensor', 0.026059905), ('comprising' 0.021353763), ('determining', 0.021172144), ('comprises', 0.018123867), ('associated', 0.012455492), ('independent', 0.0108295195), ('configured', 0.010025607), ('autonomous', 0.009854639), ('device', 0.009037715), ('location', 0.008731949), ('receiving', 0.0074082864), ('includes', 0.0070076585), ('driving', 0.0064662495), ('medium', 0.006212592), ('computer', 0.005927774)]

Comparing the topics generated by the base approach and the proposed approach, it may be seen that the topic terms of the proposed approach are more relevant to vehicle related topics. In particular, for example, topic 1 of the base approach generated topic terms such as said, wherein, least, one, element, second, comprises, and comprising (8 terms). These terms are not as meaningful in the domain of vehicles. Topic 1 of the base approach generates fewer domain specific terms such as charging, electric, mirror, system, vehicle, configured, surface, front, glass, side, and drive (11 terms). In contrast, topic 1 of the proposed approach generates fewer generic terms like: method, according, comprising, predetermined, and determining (5 terms) and more domain specific terms such as power, control, vehicle, unit, torque, device, apparatus, wheel, configured, module, braking, value, electric, and speed (14 terms).

Similarly, reviewing the topic terms of topic 2 of the base approach, more generic terms are generated: first, wherein, second, portion, one, least, end, member, according (9 terms), while fewer domain specific terms are included like air, tire, surface, direction, side, heat, valve, body, fluid, outer, inner (11 terms). In contrast, topic 2 of the proposed approach generates fewer generic terms like: element, according, comprises, comprising, and portion (5) and more domain-specific terms such as mirror, assembly, layer, rearview, light, surface, interior, tire, component, vehicular, rubber, independent, decorative, optical, and device (15 terms).

Likewise, for topic 3 of the base approach, more generic terms are generated: portion, first, wherein, second, end, member, according, and comprising (8 terms) and fewer domain specific terms are generated: vehicle, configured, direction, gear, light, position, surface, cover, side, assembly, body, and airbag (12 terms). In contrast, topic 3 of the proposed approach generates fewer generic terms like: method, based, comprising, determining, comprises, associated, configured, includes (8 terms) and more domain specific terms such as: vehicle, data, system, sensor, autonomous, location, configured, independent, device, receiving, driving, medium, and computer (13 terms).

Table 3 below summarizes the generic versus domain-specific terms in each of the three topics above:

TABLE 3

| Base Approach | Generic term count | Domain/ specific term count | Proposed Approach | Generic term count | Domain/ specific term count |
|---|---|---|---|---|---|
| Topic 1 | 8 | 11 | Topic 1 | 5 | 14 |
| Topic 2 | 9 | 11 | Topic 2 | 5 | 15 |
| Topic 3 | 8 | 12 | Topic 3 | 8 | 13 |

As seen from Table 3 above, the base approach has fewer domain-specific terms in each topic than the proposed approach, thereby indicating that the proposed approach generates more domain-aware, focused, and interpretable topic terms.

Further, in some experiments, the visual categorization of topic terms was modified to account for borderline terms including element, method, portion, member, determining, based, system, independent, device, apparatus, value, and direction. These terms may be considered either generic terms or domain-specific terms. After removing all the borderline terms from consideration and recounting the terms, Table 4 below summarizes the results:

TABLE 4

| Base Approach | Generic term count | Domain/specific term count | Proposed Approach | Generic term count | Domain/specific term count |
|---|---|---|---|---|---|
| Topic 1 | 7 | 10 | Topic 1 | 3 | 11 |
| Topic 2 | 7 | 10 | Topic 2 | 3 | 13 |
| Topic 3 | 6 | 11 | Topic 3 | 4 | 10 |

As seen from Table 4 above, the base approach still has fewer domain-specific terms in each topic than the proposed approach, thereby indicating that the proposed approach generates more domain-aware, focused, and interpretable topic terms even when borderline topic terms are not considered.

A second set of experiments was conducted on a news related dataset, retrieved from ucirvine/reuters21578• Datasets at Hugging Face. The news dataset includes human categories. The proposed approach was compared with a base approach to determine if the proposed approach results in more domain-focused topic terms. The base approach used all the text in the documents as input to a topics model (e.g., SVD topics model). ChatGPT was used as a judge of the quality of the topics used by the baseline approach relative to the proposed approach. After obtaining the topic labels and matching them with the human category labels, the relevance of the top 20 topic terms was compared with the original labels. The SVD topics model was also used in the proposed approach.

The base approach used SVD topics model to generate topics using full text of the input set of documents. After generating the topics using both methods, ChatGPT was used as a judge. ChatGPT did not generate the topics nor was it used in any way to generate the topics themselves. The following prompt was used to ask ChatGPT how related the identified topics were to the pre-determined categories:

Prompt: "Which set of topic words is more closely related to the topic of {label}? {topic_words_text}, {topic_words_liti}"

Using the above prompt, the results showed that among the seven topics compared, ChatGPT identified six sets of topic words as more closely related to the original mapped human-applied categories labels. Table 5 shows an example of one of the topics and the ChatGPT analysis of each approach: the baseline approach is called topic-words-text because the full text was used to generate the topics. The proposed approach is called topic-words-liti because a rule-based model was used to extract text segments using a rule syntax called LITI provided by SAS Institute Inc. of Cary, North Carolina:

TABLE 5

| | |
|---|---|
| Label | crude: Oil production and prices |
| Topic_words_text | topic 4: ['opec', 'oil', 'bpd', 'barrel', 'ecuador', 'production', 'crude', 'price', 'arabia', 'quota', 'output', 'saudi', 'day', 'pipeline', 'venezuela', 'energy', 'december'] |
| Topic_words_liti | topic 4: ['opec', 'oil', 'barrel', 'bpd', 'production', 'crude', 'price', 'quota', 'output', 'day', 'pipeline', 'energy', 'member', 'supply', 'refinery', 'official', 'earthquake'] |
| ChatGPT response | Both topics contain terms relevant to oil production and prices, but Topic 4-2 is more closely focused on these areas. Here's the comparison:<br>Topic 4-1:<br>Key terms: 'opec', 'oil', 'bpd', 'barrel', 'ecuador', 'production', 'crude', 'price', 'arabia', 'quota', 'output', 'saudi', 'day', 'pipeline', 'venezuela', 'energy', 'december'<br>Focus: This topic includes terms directly related to oil production and prices ('opec', 'oil', 'bpd', 'barrel', 'production', 'crude', 'price', 'quota', 'output', 'pipeline', 'energy'). However, it also includes country-specific terms ('ecuador', 'arabia', 'saudi', 'venezuela') and a specific month ('december'), which might dilute the focus.<br>Topic 4-2:<br>Key terms: 'opec', 'oil', 'barrel', 'bpd', 'production', 'crude', 'price', 'quota', 'output', 'day', 'pipeline', 'energy', 'member', 'supply', 'refinery', 'official', 'earthquake'<br>Focus: This topic also includes terms directly related to oil production and prices ('opec', 'oil', 'barrel', 'bpd', 'production', 'crude', 'price', 'quota', 'output', 'pipeline', 'energy'). Additionally, it includes terms like 'member', 'supply', 'refinery', and 'official', which are relevant to the organizational and supply chain aspects of oil production and distribution.<br>Conclusion: Topic 4-2 is more closely aligned with oil production and prices due to its concentration on terms directly related to the oil industry and the exclusion of country-specific and time-specific terms. |

To compare the topics identified by the base approach above relative to the topics identified by the proposed approach, various metrics were computed for evaluating the quality of topic models. The topic model used in the experiment is SAS® tmSvd action provided by SAS Institute Inc. of Cary, North Carolina. K=5 or K=10, and a default English stop list were used. K is the number of topics generated.

Two different datasets were used in this experiment: patent documents and news articles. The patent data included 5,311 documents from five categories: A24 (TOBACCO), B60 (VEHICLES IN GENERAL), C12 (BIOCHEMISTRY), G10 (MUSICAL INSTRUMENTS), and H01 (ELECTRIC ELEMENTS). The news articles included 1,611 documents with 10 topic labels: acq, earn, trade, ship, grain, crude, wheat, money-fx, interest, and gnp. The news dataset is multi-labeled. The experiments employed the following three metrics for topic model evaluation:

Topic Coherence based on embeddings: 1) Compute the pairwise similarities between the top n topic words based on embeddings (Bert and OpenAI embeddings) in each topic. 2) Then average all the scores to get the overall coherence score. This metric measures how well the top words in a topic relate to each other, providing an indication of the semantic interpretability and coherence of topics generated by a topic model. Higher coherence scores generally indicate that the topic words are more semantically similar or related, making the topics more meaningful and understandable.

Gini Index Calculation: 1) Extract the top 20/50/100 term weights from each topic of the topic model to calculate the Gini index. The weights used to calculate the Gini index are all positive numbers. 2) Then compute the mean Gini index across all topics. The Gini index may be interpreted as an "ideal" topic vector is one where only a few terms have high weights, while the majority have very low weights. This indicates that the topic is well-defined and focused, with a clear distinction between the terms that are highly relevant to the topic and those that are not. The Gini index quantifies the inequality within the distribution of term weights in a topic vector. A high Gini index indicates high inequality, which in this context translates to a few terms having much higher weights than the others. A higher Gini index in this context suggests that the topic model is effective at distinguishing key terms for each topic, resulting in a more focused and coherent topic.

Topic Clustering Accuracy Based on Human Categories: 1) Assign topic labels to each document using the topic model. 2) Create a label-to-topic mapping. 3) Map the category labels to topic labels using the label-to-topic mapping. 4) Calculate the actual, predicted, and matched label counts for each topic, and obtain the precision, recall, and F-score for each topic, as well as the micro and macro metrics. Since topic clustering is an unsupervised model, the predicted topics do not directly correspond to the labels in the data. Therefore, the following method was used to map the category labels to the predicted topic labels: (1) for each category label, the closest matching topic label was assigned, (2) for each topic label, the closest matching category label was assigned, and (3) the two mappings were combined to obtain a mapping where each category label corresponds to multiple topic labels. This metric evaluates how well the topic clusters align with human labels to some extent.

Results of Comparisons for Topic Coherence

Table 6 below shows topic coherence metrics based on word embeddings (Bert and OpenAI) plus cosine similarities. The results show that the topic models using the proposed approach achieved an increase of around 2 points in the news articles dataset and around 1 point in the patent dataset compared to using the full text base approach.

TABLE 6

| Dataset | Method | K (topic num) | Bert similarity | OpenAI similarity |
|---|---|---|---|---|
| News | Base Approach | 10 | Mean: 0.713<br>Std Deviation: 0.08<br>Range: 0.514<br>Median: 0.711 | Mean: 0.317<br>Std Deviation: 0.127<br>Range: 0.884<br>Median: 0.294 |
| | Proposed Approach | 10 | Mean: 0.738<br>Std Deviation: 0.071<br>Range: 0.479<br>Median: 0.74 | Mean: 0.333<br>Std Deviation: 0.115<br>Range: 0.837<br>Median: 0.316 |
| Patents | Base Approach | 5 | Mean: 0.744<br>Std Deviation: 0.061<br>Range: 0.473<br>Median: 0.751 | Mean: 0.342<br>Std Deviation: 0.091<br>Range: 0.418<br>Median: 0.339 |
| | Proposed Approach | 5 | Mean: 0.752<br>Std Deviation: 0.059<br>Range: 0.473<br>Median: 0.761 | Mean: 0.352<br>Std Deviation: 0.105<br>Range: 0.857<br>Median: 0.351 |

Results of Comparisons for Gini Index

Tables 7 and 8 below displays the Gini index metrics for the top 20/50/100 topic term weights. All results indicate that the topic model trained using the proposed approach achieved higher values, suggesting superior topic modeling performance in this context.

TABLE 7

Table 7: news dataset when k = 10

| Method | Top 20 term weights | Top 50 term weights | Top 100 term weights |
|---|---|---|---|
| Base Approach | Mean: 0.186<br>Std Deviation: 0.058<br>Range: 0.218<br>Median: 0.181 | Mean: 0.249<br>Std Deviation: 0.051<br>Range: 0.158<br>Median: 0.243 | Mean: 0.294<br>Std Deviation: 0.054<br>Range: 0.168<br>Median: 0.282 |
| Proposed Approach | Mean: 0.213<br>Std Deviation: 0.057<br>Range: 0.162<br>Median: 0.205 | Mean: 0.281<br>Std Deviation: 0.038<br>Range: 0.128<br>Median: 0.269 | Mean: 0.328<br>Std Deviation: 0.047<br>Range: 0.151<br>Median: 0.31 |

TABLE 8

Table 8: patents dataset when k = 5

| Method | Top 20 term weights | Top 50 term weights | Top 100 term weights |
|---|---|---|---|
| Full text | Mean: 0.157<br>Std Deviation: 0.046<br>Range: 0.106<br>Median: 0.126 | Mean: 0.197<br>Std Deviation: 0.04<br>Range: 0.099<br>Median: 0.173 | Mean: 0.25<br>Std Deviation: 0.043<br>Range: 0.12<br>Median: 0.251 |
| LITI snippets | Mean: 0.164<br>Std Deviation: 0.034<br>Range: 0.094<br>Median: 0.145 | Mean: 0.219<br>Std Deviation: 0.049<br>Range: 0.131<br>Median: 0.199 | Mean: 0.271<br>Std Deviation: 0.043<br>Range: 0.115<br>Median: 0.283 |

Results of Comparisons for Topic Clustering Accuracy

Tables 9, 10, and 11 below show the topic clustering accuracy based on human categories. The number of topics may affect this value; however, comparing different K values for the two datasets (news, patents) suggests that the overall alignment is not impacted.

For the news dataset, it may be seen that the topic labels align better with the original category labels compared to the patent data. The main source of confusion for the topic model appeared to 'acq' and 'earn', while the rest of the labels aligned well.

Table 9 shows details of the accuracy metrics and label-to-topic mappings for the news dataset when K=10

TABLE 9

| Method | | Accuracy | | | | | | | | | | | |
|---|---|---|---|---|---|---|---|---|---|---|---|---|---|
| | | 1 | 2 | 3 | 4 | 5 | 6 | 7 | 8 | 9 | 10 | Micro | Macro |
| Base Approach | Precision | 61.14 | 97.66 | 96.14 | 96.27 | 87.96 | 78.79 | 83.33 | 49.62 | 39.90 | 66.67 | 76.63 | 75.75 |
| | F1 | 68.61 | 53.31 | 67.21 | 70.49 | 80.19 | 59.43 | 65.22 | 64.04 | 51.76 | 9.97 | 58.31 | 59.02 |
| | Recall | 78.15 | 36.66 | 51.66 | 55.60 | 73.68 | 47.71 | 53.57 | 90.28 | 73.64 | 5.39 | 47.06 | 56.63 |
| | | 1 | 2 | 3 | 4 | 5 | 6 | 7 | 8 | 9 | 10 | Micro | Macro |
| Proposed Approach | Precision | 54.49 | 93.66 | 95.44 | 95.83 | 89.71 | 85.88 | 72.04 | 79.68 | 60.48 | 40.43 | 75.97 | 76.76 |
| | Recall | 77.27 | 39.00 | 47.72 | 59.48 | 68.86 | 66.97 | 93.06 | 58.65 | 75.38 | 22.29 | 53.32 | 60.87 |
| | F1 | 63.91 | 55.07 | 63.63 | 73.40 | 77.91 | 75.26 | 81.21 | 67.57 | 67.11 | 28.74 | 62.66 | 65.38 |

Table 10 below shows details of the accuracy metrics and label-to-topic mappings for the news dataset when K=5

TABLE 10

| Method | | Accuracy | | | | | | |
|---|---|---|---|---|---|---|---|---|
| | | 1 | 2 | 3 | 4 | 5 | Micro | Macro |
| Base Approach | Precision | 89.59 | 95.48 | 95.06 | 98.76 | 83.72 | 92.26 | 92.52 |
| | Recall | 75.29 | 55.72 | 51.87 | 54.45 | 60.81 | 58.36 | 59.63 |
| | F1 | 81.82 | 70.37 | 67.12 | 70.20 | 70.45 | 71.50 | 71.99 |
| | | 1 | 2 | 3 | 4 | 5 | Micro | Macro |
| Proposed Approach | Precision | 88.56 | 95.72 | 92.95 | 93.63 | 91.53 | 92.46 | 92.48 |
| | Recall | 79.47 | 51.04 | 65.69 | 63.36 | 54.41 | 60.76 | 62.79 |
| | F1 | 83.77 | 66.58 | 76.98 | 75.58 | 68.25 | 73.33 | 74.23 |

TABLE 11

| Data-set | K (topic num) | Original text | Proposed Approach |
|---|---|---|---|
| News | 10 | 'acq': [10, 3], 'earn': [2, 7], 'trade': [5], 'ship': [6], 'grain': [8], 'crude': [4], 'wheat': [8], 'money-fx': [1], 'interest': [9], 'gnp': [7] | 'acq': [3], 'earn': [8, 2, 10], 'trade': [5], 'ship': [6], 'grain': [7], 'crude': [4], 'wheat': [7], 'money-fx': [9], 'interest': [1], 'gnp': [9] |
| | 5 | 'acq': [3], 'earn': [2], 'trade': [5], 'ship': [4], 'grain': [5], 'crude': [4], 'wheat': [5], 'money-fx': [1], 'interest': [1], 'gnp': [1] | 'acq': [2], 'earn': [3], 'trade': [5], 'ship': [5], 'grain': [5], 'crude': [4], 'wheat': [5], 'money-fx': [1], 'interest': [1], 'gnp': [1] |

Table 12 shows details of the accuracy metrics and label-to-topic mappings for the patents dataset when K=5:

TABLE 12

| Method | | Accuracy | | | | | | |
|---|---|---|---|---|---|---|---|---|
| | | 1 | 2 | 3 | 4 | 5 | Micro | Macro |
| Base Approach | Precision | 100.00 | 79.53 | 68.20 | 51.69 | 98.09 | 78.58 | 79.50 |
| | Recall | 25.71 | 55.50 | 18.47 | 66.72 | 17.20 | 26.71 | 36.72 |
| | F1 | 40.90 | 65.38 | 29.07 | 58.25 | 29.27 | 39.87 | 44.57 |
| | | 1 | 2 | 3 | 4 | 5 | Micro | Macro |
| Proposed Approach | Precision | 100.00 | 69.06 | 84.91 | 77.14 | 99.08 | 85.45 | 86.04 |
| | Recall | 27.05 | 18.82 | 68.07 | 55.27 | 23.06 | 28.84 | 38.45 |
| | F1 | 42.58 | 29.58 | 75.56 | 64.40 | 37.41 | 43.12 | 49.91 |

Table 13 shows details of the accuracy metrics and label-to-topic mappings for the patents dataset when K=10:

TABLE 13

| Method | | Accuracy | | | | | | | | | | | |
|---|---|---|---|---|---|---|---|---|---|---|---|---|---|
| | | 1 | 2 | 3 | 4 | 5 | 6 | 7 | 8 | 9 | 10 | Micro | Macro |
| Base Approach | Precision | 100.00 | 88.52 | 96.91 | 50.06 | 96.49 | 98.89 | 99.54 | 59.61 | 90.10 | 85.92 | 84.29 | 86.60 |
| | Recall | 22.66 | 50.19 | 17.20 | 13.51 | 17.63 | 74.79 | 19.76 | 13.67 | 13.33 | 9.30 | 18.74 | 25.20 |
| | F1 | 36.95 | 64.06 | 29.21 | 21.28 | 29.81 | 85.17 | 32.97 | 22.24 | 23.22 | 16.78 | 30.66 | 36.17 |
| | | 1 | 2 | 3 | 4 | 5 | 6 | 7 | 8 | 9 | 10 | Micro | Macro |
| Proposed Approach | Precision | 100.00 | 88.79 | 53.89 | 96.93 | 98.40 | 98.69 | 99.68 | 58.89 | 83.87 | 95.00 | 84.73 | 87.41 |
| | Recall | 21.74 | 50.34 | 14.15 | 14.43 | 18.73 | 75.80 | 19.15 | 13.52 | 15.86 | 8.11 | 18.61 | 25.18 |
| | F1 | 35.72 | 64.25 | 22.41 | 25.12 | 31.47 | 85.74 | 32.13 | 21.99 | 26.68 | 14.94 | 30.52 | 36.05 |

application. The various singular/plural permutations may be expressly set forth herein for sake of clarity.

TABLE 14

| Data | K (topic num) | Original text | LITI snippets |
|---|---|---|---|
| Patents | 5 | 'H01': [1, 3, 4, 5], 'G10': [2], 'B60': [2], 'C12': [3], 'A24': [4] | 'H01': [1, 3, 5], 'G10': [2], 'B60': [2], 'C12': [4], 'A24': [3] |
| | 10 | 'H01': [1, 3, 4, 5, 7, 8, 9, 10], 'G10': [2], 'B60': [2], 'C12': [6], 'A24': [8] | 'H01': [1, 3, 4, 5, 7, 8, 9, 10], 'G10': [2], 'B60': [2], 'C12': [6], 'A24': [8] |

Overall, the metrics are more reliable when selecting a K value that matches the number of categories in the original data. Under this premise, on the news dataset, the topic model based on the proposed approach improved by approximately 15 points in F-score, and on the patents dataset, by about 5 points.

The herein described subject matter illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents. The word "illustrative" is used herein to mean serving as an example, instance, or illustration. Any aspect or design described herein as "illustrative" is not necessarily to be construed as preferred or advantageous over other aspects or designs.

What is claimed is:

1. A non-transitory computer-readable medium comprising computer-readable instructions stored thereon that when executed by a processor cause the processor to:

- receive a set of documents from which to generate at least one topic;
- create at least one information extraction model for the set of documents, wherein to create the at least one information extraction model, the computer-readable instructions further cause the processor to:
  - identify key information associated with a domain to which the set of documents belong to, wherein to identify the key information associated with the domain, the computer-readable instructions further cause the processor to:
    - identify one or more grammatical patterns from the set of documents;
    - identify an entity type from the set of documents;
    - identify one or more of a keyword, phrase, or list of information from the set of documents; and
    - create the one or more rule sets based on the one or more grammatical patterns, the entity type, and the one or more of the keyword, phrase, or list of information by:
      - defining one or more rules for extracting first text segments associated with the one or more grammatical patterns, the entity type, and the one or more of the keyword, phrase, or list of information; and
      - adding context around the first text segments to obtain the one or more rule sets; and
  - encode the key information into the at least one information extraction model;
- execute the at least one information extraction model to extract a plurality of text segments from the set of documents, wherein extracting the plurality of text segments comprises:
  - applying one or more rule sets defined for at least one entity, word list, or grammatical pattern; and
  - extracting a plurality of text portions from the set of documents based on the one or more rule sets as the plurality of text segments;
- input at least a subset of the plurality of text segments into an unsupervised machine learning model; and
- execute the unsupervised machine learning model to output the at least one topic for the set of the documents, wherein:

- the at least one topic is used to generate a compressed prompt representing the set of documents,
- generating the compressed prompt includes concatenating a plurality of topic terms output by the unsupervised machine learning model,
- the plurality of topic terms being concatenated in an order from a given topic term having a highest weight value to another given topic term having a lowest weight value,
- a given weight value assigned to a topic term of the plurality of topic terms represents a relevance of the topic term to the at least one topic; and
- the compressed prompt is input into a language model that is executed to generate a summary of the set of documents.

2. The non-transitory computer-readable medium of claim 1, wherein the one or more grammatical patterns comprises nouns and modifiers, verb phrases, or adjectival phrases.

3. The non-transitory computer-readable medium of claim 1, wherein the first text segments have subject-predicate-object structure or subject-predicate structure or predicate-object structure.

4. The non-transitory computer-readable medium of claim 3, wherein to add context around the first text segments, the computer-readable instructions further cause the processor to:

- identify a predetermined number of tokens surrounding the subject-predicate-object structure or the subject-predicate structure or the predicate-object structure;
- remove numbers and punctuations from the predetermined number of tokens to obtain a subset of tokens; and
- combine the subset of tokens with the subject-predicate-object structure or the subject-predicate structure or the predicate-object structure to add the context.

5. The non-transitory computer-readable medium of claim 1, wherein to identify the one or more grammatical patterns from the set of documents, the computer-readable instructions further cause the processor to:

- determine sentence boundaries in each of the set of documents to obtain a plurality of sentences;
- determine word boundaries in each of the plurality of sentences to generate a plurality of tokens;
- lemmatize each of the plurality of tokens;
- apply a part-of-speech label to each of the plurality of tokens; and
- determine the one or more grammatical patterns based on the part-of-speech label and the plurality of tokens.

6. The non-transitory computer-readable medium of claim 1, wherein the entity type is based on the domain.

7. The non-transitory computer-readable medium of claim 1, wherein the computer-readable instructions further cause the processor to:

- compute a term-frequency inverse document frequency (TF-IDF) score for each of the plurality of text segments;
- select a predetermined number of the plurality of text segments whose TF-IDF score is greater than a predetermined threshold to obtain a subset of text segments; and
- input the subset of text segments into the unsupervised machine learning model.

8. The non-transitory computer-readable medium of claim 1, wherein the unsupervised machine learning model is a topic model.

9. The non-transitory computer-readable medium of claim 8, wherein the topic model is a Latent Dirichlet Allocation (LDA) clustering model or a Singular Value Decomposition (SVD) model.

10. The non-transitory computer-readable medium of claim 1, wherein the at least one information extraction model is a rule-based model.

11. The non-transitory computer-readable medium of claim 1, wherein the at least one information extraction model is a machine learning model trained for a specific domain or application.

12. The non-transitory computer-readable medium of claim 1, wherein the at least one information extraction model is a combination of a rule-based model and a machine learning model trained for a specific domain or application.

13. The non-transitory computer-readable medium of claim 1, wherein multiple text segments are generated from each document of the set of documents.

14. The non-transitory computer-readable medium of claim 1, wherein the computer-readable instructions further cause the processor to:

rank the plurality of text segments based on a frequency of occurrence of each text segment of the plurality of text segments in the set of documents, wherein higher the frequency of occurrence, higher the rank of the text segment;

select a predetermined number of highest ranked text segments to obtain a subset of text segments; and input the subset of text segments into the unsupervised machine learning model.

15. The non-transitory computer-readable medium of claim 1, wherein each text segment of the plurality of text segments comprises one or more of a plurality of key words from the set of documents, a plurality of key phrases from the set of documents, context text related to the plurality of key words or the plurality of key phrases by semantic role, domain relevance, or position in the set of documents, or a combination of key words and key phrases from the set of documents, or the context text.

16. The non-transitory computer-readable medium of claim 1, wherein the at least one topic is used to generate sentiment for the set of documents.

17. The non-transitory computer-readable medium of claim 1, wherein each of the at least one topic comprises a plurality of topic terms, and wherein each topic term of the plurality of topic terms is associated with a weight value indicative of a relevance of the topic term to the at least one topic.

18. The non-transitory computer-readable medium of claim 17, wherein each of the at least one topic has a Gini index in a range between and including 4-15%.

19. The non-transitory computer-readable medium of claim 1, wherein extracting the plurality of text portions from the set of documents further comprises:

identifying, by the processor, one or more subject-predicate-object structures within the plurality of text segments; and selecting, by the processor, at least a subset of the plurality of text portions based on the identified subject-predicate-object structures.

20. The non-transitory computer-readable medium of claim 1, wherein the computer-readable instructions further cause the processor to:

augment at least one text segment of the plurality of text segments with contextual information comprising at least one of surrounding words, syntactic dependencies, or semantic role information prior to inputting the at least a subset of the plurality of text segments into the unsupervised machine learning model.

21. The non-transitory computer-readable medium of claim 1, wherein inputting the at least a subset of the plurality of text segments into the unsupervised machine learning model comprises:

ranking the plurality of text segments based on a relevance score associated with domain-specific key information; and selecting the at least a subset of the plurality of text segments based on the ranking.

22. The non-transitory computer-readable medium of claim 1, wherein creating the at least one information extraction model further comprises:

training a machine learning model using domain-specific training data to identify at least one of entities, relationships, or key phrases associated with a predefined domain of the set of documents.

23. The non-transitory computer-readable medium of claim 1, wherein the computer-readable instructions further cause the processor to:

generate, based on the at least one topic, a compressed representation of the set of documents; and provide the compressed representation as input to a language model to generate at least one of a summary or a sentiment output for the set of documents.

24. A system comprising:

a memory having computer-readable instructions stored thereon; and a processor that executes the computer-readable instructions to:

receive a set of documents from which to generate at least one topic;

create at least one information extraction model for the set of documents wherein creating the at least one information extraction model includes:

identifying key information associated with a domain to which the set of documents belong to, wherein identifying the key information associated with the domain includes:

identifying one or more grammatical patterns from the set of documents;

identifying an entity type from the set of documents;

identifying one or more of a keyword, phrase, or list of information from the set of documents; and creating the one or more rule sets based on the one or more grammatical patterns, the entity type, and the one or more of the keyword, phrase, or list of information by:

defining one or more rules for extracting first text segments associated with the one or more grammatical patterns, the entity type, and the one or more of the keyword, phrase, or list of information; and adding context around the first text segments to obtain the one or more rule sets; and encoding the key information into the at least one information extraction model;

execute the at least one information extraction model to extract a plurality of text segments from the set of documents, wherein extracting the plurality of text segments comprises:

applying one or more rule sets defined for at least one entity, word list, or grammatical pattern; and extracting a plurality of text portions from the set of documents based on the one or more rule sets as the plurality of text segments;

input at least a subset of the plurality of text segments into an unsupervised machine learning model; and execute the unsupervised machine learning model to output the at least one topic for the set of the documents, wherein:

the at least one topic is used to generate a compressed prompt representing the set of documents, generating the compressed prompt includes concatenating a plurality of topic terms output by the unsupervised machine learning model, the plurality of topic terms being concatenated in an order from a given topic term having a highest weight value to another given topic term having a lowest weight value, a given weight value assigned to a topic term of the plurality of topic terms represents a relevance of the topic term to the at least one topic;

the compressed prompt is input into a language model that is executed to generate a summary of the set of documents.

25. The system of claim 24, wherein to identify the one or more grammatical patterns from the set of documents, the computer-readable instructions further cause the processor to:

determine sentence boundaries in each of the set of documents to obtain a plurality of sentences;

determine word boundaries in each of the plurality of sentences to generate a plurality of tokens;

lemmatize each of the plurality of tokens;

apply a part-of-speech label to each of the plurality of tokens; and determine the one or more grammatical patterns based on the part-of-speech label and the plurality of tokens.

26. The system of claim 24, wherein the unsupervised machine learning model is a topic model, and wherein the topic model is a Latent Dirichlet Allocation (LDA) clustering model or a Singular Value Decomposition (SVD) model.

27. The system of claim 24, wherein the at least one information extraction model is a rule-based model, a machine learning model trained for a specific domain or application, or a combination of the rule-based model and the machine learning model trained for a specific domain or application.

28. The system of claim 24, wherein each of the at least one topic has a Gini index in a range between and including 4-15%.

29. A method comprising:

receiving, by a processor executing computer-readable instructions stored on a memory, a set of documents from which to generate at least one topic;

creating, by the processor, at least one information extraction model for the set of documents, wherein creating the at least one information extraction model includes:

identifying key information associated with a domain to which the set of documents belong to, wherein identifying the key information associated with the domain includes:

identifying one or more grammatical patterns from the set of documents;

identifying an entity type from the set of documents;

identifying one or more of a keyword, phrase, or list of information from the set of documents; and creating the one or more rule sets based on the one or more grammatical patterns, the entity type, and the one or more of the keyword, phrase, or list of information by:

defining one or more rules for extracting first text segments associated with the one or more grammatical patterns, the entity type, and the one or more of the keyword, phrase, or list of information; and adding context around the first text segments to obtain the one or more rule sets; and encoding the key information into the at least one information extraction model;

executing, by the processor, the at least one information extraction model to extract a plurality of text segments from the set of documents, wherein extracting the plurality of text segments comprises:

applying, by the processor, one or more rule sets defined for at least one entity, word list, or grammatical pattern; and extracting, by the processor, a plurality of text portions from the set of documents based on the one or more rule sets as the plurality of text segments;

inputting, by the processor, at least a subset of the plurality of text segments into an unsupervised machine learning model; and executing, by the processor, the unsupervised machine learning model to output the at least one topic for the set of the documents, wherein:

the at least one topic is used to generate a compressed prompt representing the set of documents, generating the compressed prompt includes concatenating a plurality of topic terms output by the unsupervised machine learning model, the plurality of topic terms being concatenated in an order from a given topic term having a highest weight value to another given topic term having a lowest weight value, a given weight value assigned to a topic term of the plurality of topic terms represents a relevance of the topic term to the at least one topic; and the compressed prompt is input into a language model that is executed to generate a summary of the set of documents.

30. The method of claim 29, wherein each of the at least one topic has a Gini index in a range between and including 4-15%.

* * * * *